United States Patent [19]

Nelson et al.

[11] Patent Number: 5,285,256
[45] Date of Patent: Feb. 8, 1994

[54] REAR-LOOKING APPARATUS AND METHOD FOR DETECTING CONTRAILS

[75] Inventors: Loren D. Nelson, Evergreen; David C. MacPherson, Conifer, both of Colo.

[73] Assignee: Ophir Corporation, Littleton, Colo.

[21] Appl. No.: 921,502

[22] Filed: Jul. 28, 1992

[51] Int. Cl.$^5$ ............................................. G01C 3/00
[52] U.S. Cl. ................................. 356/342; 340/945; 356/4; 356/5
[58] Field of Search ............... 356/4, 5, 342; 340/601, 340/945

[56] References Cited

U.S. PATENT DOCUMENTS

| | | | |
|---|---|---|---|
| 4,754,151 | 6/1988 | Billard | 356/342 X |
| 4,965,573 | 10/1990 | Gallagher et al. | 340/968 |
| 5,206,698 | 4/1993 | Werner et al. | 356/5 |

OTHER PUBLICATIONS

Knollenberg, R. G. "Measurements of the Growth of the Ice Budget in a Persisting Co trail", *Journal of the Atmospheric Sciences*, vol. 29, Oct. 1972, pp. 1367–1374.

Takeuchi, N., et al., "Random Modulation CW Lidar," *Applied Optic*, vol. 22, May 1, 1983, pp. 1382–1386.

Takeuchi, Nobuo, et al., "Diode-laser Random-modulation CW Lidar," *Applied Optics*, vol. 25, Jan. 1, 1986, pp. 63–67.

Nagasawa, Chikao, et al., "Random Modulation CW Rador Using New Random Sequence," *Applied Optics*, vol. 29, Apr. 1, 1990, pp. 1466–1470.

*Primary Examiner*—Jill A. Johnston
*Attorney, Agent, or Firm*—Chester E. Martine, Jr.

[57] ABSTRACT

Contrail detection aft of an aircraft is provided by a rear-looking ranging system carried by the aircraft. A randomly modulated laser beam is directed into a detection volume aft of the aircraft for scatter back toward a detector on the aircraft. Bistatic mounting of a laser and a telescope of the detector preclude sensing of the scattered beam forward of the detection volume. Processing of the detected scattered beam includes cross correlation and analysis to indicate the formation of the contrail aft of the aircraft.

26 Claims, 19 Drawing Sheets

Microfiche Appendix Included
(21 Microfiche, 1 Pages)

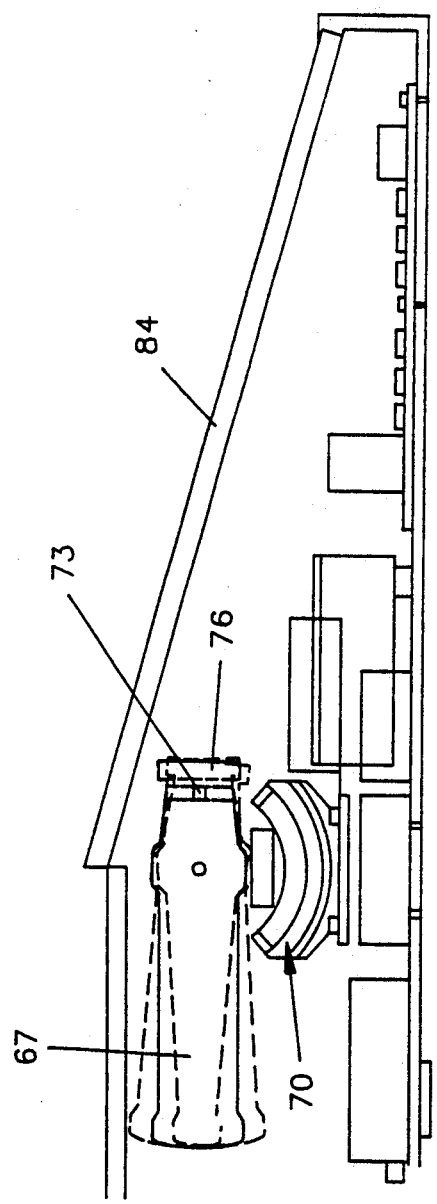
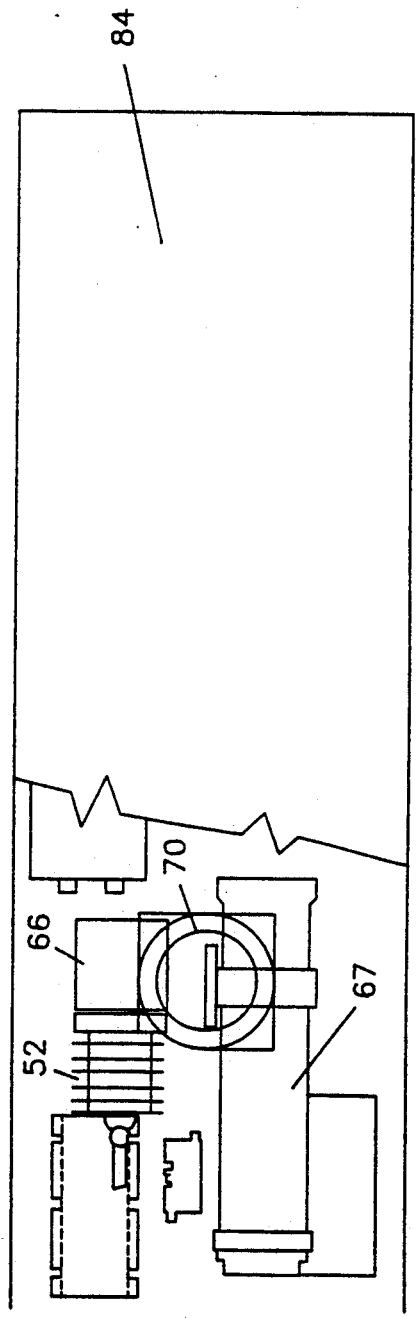
FIG. 8A
FIG. 8B

REAR-LOOKING APPARATUS AND METHOD FOR DETECTING CONTRAILS

Pursuant to 37 C.F.R. 1.96(b)(2)(i), a computer program listing is submitted herewith in the form of microfiche prepared from copies of photographed paper copy, including one microfiche having twenty-one frames, and is referred to as the Microfiche Appendix.

BACKGROUND OF THE INVENTION

1. Field of the Invention

This invention relates to detecting condensation trails behind an aircraft, and more particularly to a rear-looking system and a method for distinguishing contrails from other atmospheric phenomena occurring behind an aircraft.

2. Discussion of Prior Art

Jet engine exhaust condensation trails ("contrails") have been studied from a number of standpoints. For example, Robert G. Knollenberg has reported on various studies performed using an aircraft which was controlled so that its engines intentionally produced contrails. The aircraft was then flown into the contrails so that a forward-looking optical-array spectrometer could sense the distribution of ice crystals in the contrails. The spectrometer output was used to determine whether jet aircraft traffic increases or decreases water abundance at sub-tropopause levels. Because onboard technicians were available to detect contrail formation, and the aircraft could change course to fly through the visually-detectable contrails, the pilot in these studies was not faced with the problem of automatically (non-visually) and quickly determining whether the aircraft was causing contrails to be formed.

Through these and other studies, many aspects of contrails are known. However, for a given aircraft operating at a particular time, it is still difficult to control the engines so that they never produce contrails. Therefore, there is still a need to detect when an aircraft engine is producing a contrail, and in particular, to automatically detect such a contrail from the aircraft itself without relying on actual visual observations as in the experimental studies conducted by Knollenberg.

Systems which have been used for cloud and aerosol studies include random modulation continuous wave laser radar ("lidar"). While these systems have generally been ground-based and directed into the sky for studying clouds and aerosols, it was reported in *Applied Optics*, Vol. 22, No. 9, in May 1983, that such systems are suitable for airborne use. However, these and other lidar systems with which applicants are familiar (e.g., *Applied Optics*, January 1986, Vol. 25, No. 1; and *Applied Optics*, April 1990, Vol. 29, No. 10) have not been directed to distinguishing clouds from contrails, and the manner in which such systems would be mounted on the aircraft has not been specified. Further, to provide in an airborne system the altitude ranging features of a ground-based lidar system, the outgoing lidar signals of the system of the *Applied Optics* articles would be directed upwardly from the aircraft through the layers of the atmosphere. Based on the disclosed use of such lidar system, there would be no reason for the outgoing lidar signal to be directed other than upwardly from the aircraft.

Other atmospheric analysis systems, such as Knollenberg's noted above, have been forwardly directed, with probes being spaced to allow the contrail particles to flow through a sensing area as the plane flies through the contrail. Since the Knollenberg sensor must be in the contrail for measurement purposes, whereas the system disclosed in the *Applied Optics* articles is a device for making observations at long distance, the "fly through" system of Knollenberg does not suggest mounting the normally upwardly oriented lidar systems in a horizontal position to look forwardly for cloud observation.

Neither the Knollenberg nor the *Applied Optics* articles teach how a cloud observation device could distinguish a cloud from a contrail when the contrail is in the cloud. As to Knollenberg, it appears clear that Knollenberg would not even be faced with such problem because the goal of the studies was to analyze only the contrail. Thus, the pilot would not even fly the aircraft into a contrail which was in a cloud. As to the *Applied Optics* articles, even if one were to use a lidar in a forward-looking manner, there would be no assurance that differences in amplitude of return signals would be an indication of a contrail. For example, in FIG. 7 of the *Applied Optics* article, January, 1986, Vol. 25, No. 1, aerosol and one cloud are shown having a higher amplitude return signal than a more distant cloud, indicating that such is determined by various factors.

From another aspect, if the Knollenberg or the *Applied Optics* airborne systems were used to look ahead through horizontally spaced cloud formations which contain contrails, the aircraft would move toward the contrail and the clouds, causing all of the returns from the clouds and the contrail to appear at ranges which vary with changes in the distance from the aircraft to the clouds and the contrail. Based on these articles, all targets which are looked at in the forward direction (as in Knollenberg) would become closer to the aircraft as the aircraft approaches them. The fact that all targets, such as clouds or contrails, would all become closer to the aircraft as it flies toward them would cause the location of all of the clouds (as indicated by the "range" scale in FIG. 7) to be shown uniformly closer to the aircraft. Thus, in this situation, there would not be any signal from the clouds or the contrail which always stays at the same range from the aircraft.

Neither the Knollenberg nor the *Applied Optics* articles discuss making changes in the direction of the output from the transmitter. Thus, these articles do not appreciate that there would be a difference between (1) a signal scattered back toward the aircraft from the front portion of a cloud behind the aircraft and (2) a signal scattered back toward the aircraft from the front portion of a contrail which forms behind the engines of the aircraft. In particular, the articles do not appreciate that the front portion of a contrail is generally located within the same range aft of the aircraft given stable atmospheric conditions. Therefore, the articles do not appreciate that a rearwardly directed signal which is scattered back toward the aircraft by the contrail will have a peak within that range.

These articles also do not appreciate any need to avoid detection of the contrail detecting system itself. Further, one goal of the lidars disclosed in the *Applied Optics* articles is to be able to detect phenomena at a range of many kilometers from the detector. Therefore, the 1986 *Applied Optics* article discloses that the instrument operates at 780 nm to provide weak absorption by water vapor, and thus provide an ability to obtain data from long range.

Reducing false alarms has also been a problem in airborne systems. Ward U.S. Pat. No. 4,834,531 for a Dead Reckoning Optoelectronic Intelligent Docking System granted May 30, 1989, is directed to avoiding false alarms in a satellite docking system. False alarms are avoided by continuing a target acquisition scan until a predetermined number of consecutive returns are detected.

SUMMARY OF THE PRESENT INVENTION

Prior contrail studies have been reviewed by applicants in connection with solving the problem of automatically detecting contrails from aircraft. Contrail studies indicate that contrails and cirrus clouds both form in regions that are locally supersaturated, that is, where the concentration of water vapor is in excess of thermodynamic equilibrium. For cirrus clouds, supersaturation is small, and cloud formation takes minutes to hours. On the other hand, supersaturation in contrails is very large, and formation times are from milliseconds to seconds. Also, regions which have such weak supersaturation that no cirrus clouds will form can still support the formation of contrails. Such regions in some cases enhance contrail features, and therefore contrail conspicuousness.

It is clear, therefore, that contrails and cirrus clouds can form in the same regions. This makes it important for a contrail detection system to be able to distinguish between a contrail and cirrus clouds to avoid giving false indications of a contrail when only a cirrus cloud is present. Contributing to the possible confusion of contrail particles with cloud particles is applicants' observation that the particles in an aircraft wake-entrained cloud are mixed up enough to backscatter much more efficiently than distant undisturbed clouds. However, generalizations obtained from light scattering data indicate that a contrail will be a strong reflector relative to the reflection characteristics of cirriform ice clouds. Also, light can penetrate much deeper into a cirrus cloud than into a contrail. Further, if the contrail forms in a region of the atmosphere that is supersaturated, then the growth time of the crystals is considerably extended, and the particles can become quite large (several hundred $\mu m$). In this case, the additional time also allows the particle concentrations to become diluted (from mixing, diffusion, and wind shear) and to spread across a wide region of the sky. At this point, the contrail becomes indistinguishable from a natural cirrus cloud. This process can take a few tens of minutes, and so these larger crystals are many kilometers behind the aircraft which produced them.

If an object of a contrail detector is to detect only such contrails as are produced by the engines of the aircraft carrying the detectors, the detectors may only respond to such contrails.

Another factor identified by applicants with respect to contrail detection is that it is very difficult to locate with accuracy the precise distance behind an aircraft engine at which a contrail will start to form, which is referred to as "contrail onset". Variations in aircraft size, speed, power setting, type of engine, and numerous atmospheric parameters contribute to such uncertainty. However, fairly reliable estimates are that contrail onset generally occurs within around seventy feet from the engine, and that the contrail particles generally become visible within an additional ten feet.

Applicants, observations include: (1) contrail onset occurs relatively close to an aircraft (as compared to distant clouds); (2) the signal scattered back toward the aircraft from a contrail (contrail return signal) will tend to be of significant amplitude, whereas the cirrus background clouds in which contrails can form will tend to produce lower amplitude cloud return signals which are scattered back toward the aircraft from greater distances behind the aircraft which is producing the contrails; (3) signals scattered back toward the aircraft from clouds immediately behind the aircraft should not be detected, so as to allow distinguishing the contrail return signal from the cloud return signal; and (4) when a contrail forms in a natural cloud, an outgoing, rearwardly-directed signal from the aircraft could reach the cloud before the contrail, in which case a return signal scattered back toward the aircraft would indicate the cloud at one range and the contrail onset at a more distant range, enabling one to distinguish the contrail from the cloud.

These considerations identified by applicants indicate that it is necessary to provide a ranging system for airborne contrail detection. That is, to distinguish contrails from clouds, applicants conclude that (1) the contrails should be detected much closer to the aircraft than the kilometric distances at which the contrails and the clouds may become indistinguishable; and (2) due to the imprecise closer distance behind the aircraft at which the contrail onset may occur (e.g., twenty to fifty meters behind the engine for the contrail to become visible), there is a range behind the aircraft in which detection must occur. Thus, applicants conclude that the ranging system should look rearwardly and be capable of sensing contrail onset in a range of distances starting somewhat behind, yet relatively close to, the engines as compared to (a) the kilometric distances at which the contrail and clouds may become indistinguishable, and (b) the continuous extent of the cirrus clouds through which the aircraft may be flying. The rearward, ranging feature allows cloud-contrail distinction based on applicants' observation that the signal scattered back toward the aircraft from the point of contrail onset will be at a relatively constant distance from the engines, and will be of greater amplitude than the lower amplitude signals which will be scattered back toward the aircraft over a relatively long distance behind the aircraft by the background cirrus clouds. Applicants also observe, then, that a ranging system for contrail detection will detect a peak in the signals scattered back toward the aircraft, where the peak corresponds to a distance behind the aircraft at which the contrail onset occurs. An additional observation of applicants is that the ranging system must be capable of operating in a high light background without saturating. Saturation is prevented by a narrow band interference filter and feedback that keeps the laser wavelength within the filter bandpass, and by a bistatic arrangement of a laser and a detector. Additionally, a detector with a large dynamic range is used.

With these observations in mind, it is a general object of the present invention to provide an airborne system which is capable of distinguishing between contrails produced by aircraft engines and clouds through which the aircraft may be flying, to notify the pilot of the aircraft that contrails are being produced.

Another object of the present invention is to mount a lidar on an aircraft for directing transmitted signals rearwardly to be scattered back toward the aircraft by any contrail produced by an engine of the aircraft, where the signal scattered back toward the aircraft by a cloud through which the aircraft may be flying is always distinguishable from the signal scattered back toward the aircraft by a contrail.

A further object of the present invention is to provide a lidar for use in association with each engine of an aircraft, with each such lidar generating an output signal distinguishable from that of the other lidar, so that if only one engine is producing a contrail, the engine which is producing the contrail may be identified.

A still other object of the present invention resides in the operation of airborne lidars at a wavelength which is highly absorbed by water vapor, and at low power, so that at a distance from the aircraft relatively far from a contrail onset distance, the lidar signal will be of minimal amplitude and thus not easily detectible.

A still further object of the present invention is to rapidly modulate an output signal of an airborne, rear-looking lidar so that the distance rearward of the aircraft at which the signal may be backscattered may be related to the amplitude of the signal at that distance.

With these and other objects in mind, the apparatus and method of the present invention use the principle that regardless of aircraft and atmospheric conditions, there is a limited range of distance rearward of an aircraft at which contrail onset generally occurs. The present invention contemplates rearwardly directing a continuous wave randomly modulated lidar output signal at an angle relative to the axis of an engine of the aircraft so that any contrail which has an onset in such limited range will cause the output signal to be scattered back toward the aircraft in the form of a return signal which is sensed by a detector carried by the aircraft. A telescope defines a field of view for the detector, which field of view is at an angle with respect to the direction of the lidar output signal. The output signal is at a selected wavelength and power so that at a distance from the aircraft which is many times that of the contrail onset distance, the portion of the output signal which is not backscattered will be difficult to detect. The system includes one such lidar signal for each engine of the aircraft, with each signal being modulated using a different code. In this manner, the return signal scattered back toward the aircraft from a contrail produced by one engine is distinguishable from the return beam scattered back toward the aircraft from a contrail produced by the other engine. The detector senses the return signal from the contrail onset, which return signal is at an amplitude generally higher than the amplitude of a return signal scattered back from clouds behind the aircraft. Also, the range from the aircraft at which the onset of a particular contrail occurs in stable atmospheric and engine operating conditions is relatively constant, such that an output or profile signal from the system includes a peak which is indicated as generally remaining at a given distance from the aircraft. On the other hand, the remainder of the profile signal resulting from the clouds has no peak in the region occupied by the contrail, has a generally lower amplitude, and extends (a) at a range behind the aircraft beyond the peak which results from the contrail onset, and (b) from the point of laser beam-contrail intersection forward to the point of intersection of the telescope field of view with the laser beam. The relatively constant location of the contrail onset, and the greater amplitude of the return signal resulting therefrom, reliably distinguish the contrail from any clouds in the area of the aircraft, and avoid false indications that a contrail being formed.

BRIEF DESCRIPTION OF THE DRAWINGS

Other objects, features and advantages of the present invention will be apparent from an examination of the following detailed descriptions which include the attached drawings in which:

FIGS. 4D and 4E show each peak being easily distinguishable from the signal from clouds in which the contrails are located;

FIG. 6A illustrates the temporal modulation of the laser beam in terms of output power versus time increment (indicated as "state number" to refer to an ON or OFF state of the laser beam) for one output sequence; FIG. 6B illustrates the average sampled intensity of the return signal as a function of time increment before cross correlation, where the graph shows return data corresponding to one such output sequence; and FIG. 6C illustrates a profile resulting from a cross correlation process performed on the data shown in FIG. 6B;

FIGS. 7A–7E, 7F-1, 7F-2, 7G and 7H are flow charts of computer software which provides instructions for a digital signal processor of the system;

FIGS. 8A and 8B are respective elevational and top views of a pod which houses the system of the present invention, illustrating a movable platform for the laser and the telescope.

GENERAL DESCRIPTION OF CONTRAIL

Figure 1:
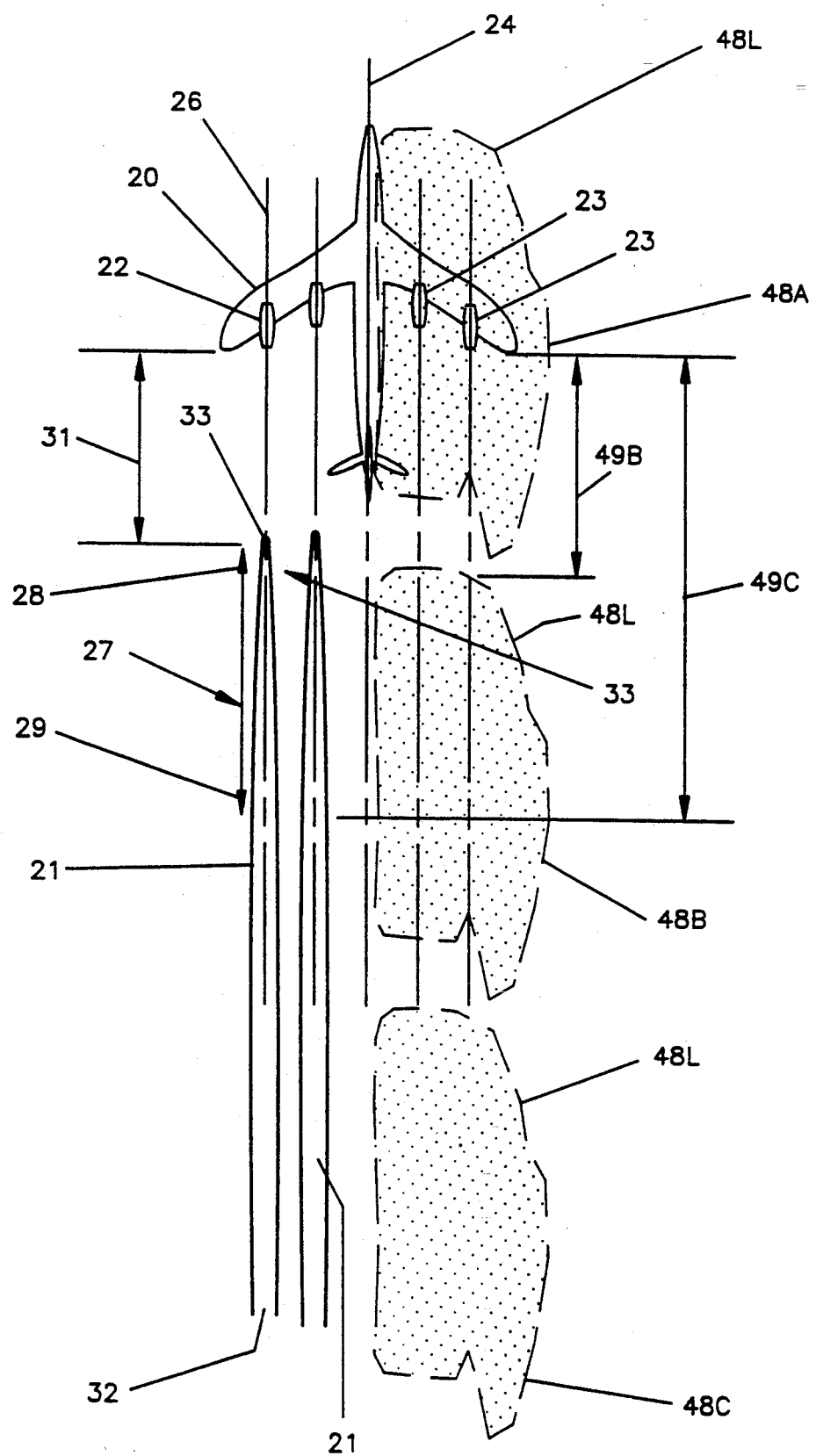
FIG. 1 is a view of a flying aircraft, two engines of which are operating so as to cause condensation trails (contrails) to form behind the aircraft.

Referring now to FIG. 1, an aircraft 20 is shown as viewed looking down on it from above. The aircraft 20 is flying at an altitude, in atmospheric conditions and under control such that a condensation trail 21 (referred to as a "contrail") is produced aft of two engines 22 (shown on the left of the aircraft 20 when looking forward in the direction of flight), but not aft of the other two engines 23 of the aircraft 20 (shown on the right of the aircraft when looking forward). To assist in describing the present invention, there is shown in FIG. 1 an axis 24 of the aircraft 20, and parallel thereto an axis 26 of the left outboard engine 22 (which is selected as an example for purposes of description and referred to as the LOB engine). A range 27 of distances is shown behind the LOB engine 22 and extending along the engine axis 26. The range 27 is defined by a near arrowhead 28 and a far arrowhead 29 The range 27 extends from an onset distance 31 relatively close to the aircraft 20 as compared to a trailing end 32 of the contrail 21. The onset distance 31 identifies the closest distance from the LOB engine 22 at which an onset 33, or the front portion of the contrail 21, would generally occur. As noted above, depending on various atmospheric and aircraft operational factors, this onset distance 31 is from twenty to fifty meters behind the LOB engine 22.

The contrail 21 has a relatively abrupt start, which becomes fully defined at the onset 33, and visible close to (e.g., within ten feet of) the onset 33. Electromagnetic radiation (such as a laser beam 34, FIG. 3) transmitted from the aircraft 20 will be reflected or scattered back toward the aircraft 20 from the contrail 21, starting at the onset 33 of the contrail 21. The portion of the laser beam 34 that is scattered back to the aircraft 20 is referred to as a return signal 36, and is "backscatter" in the sense that the return signal is scattered "back" toward the aircraft 20.

Figure 2A:
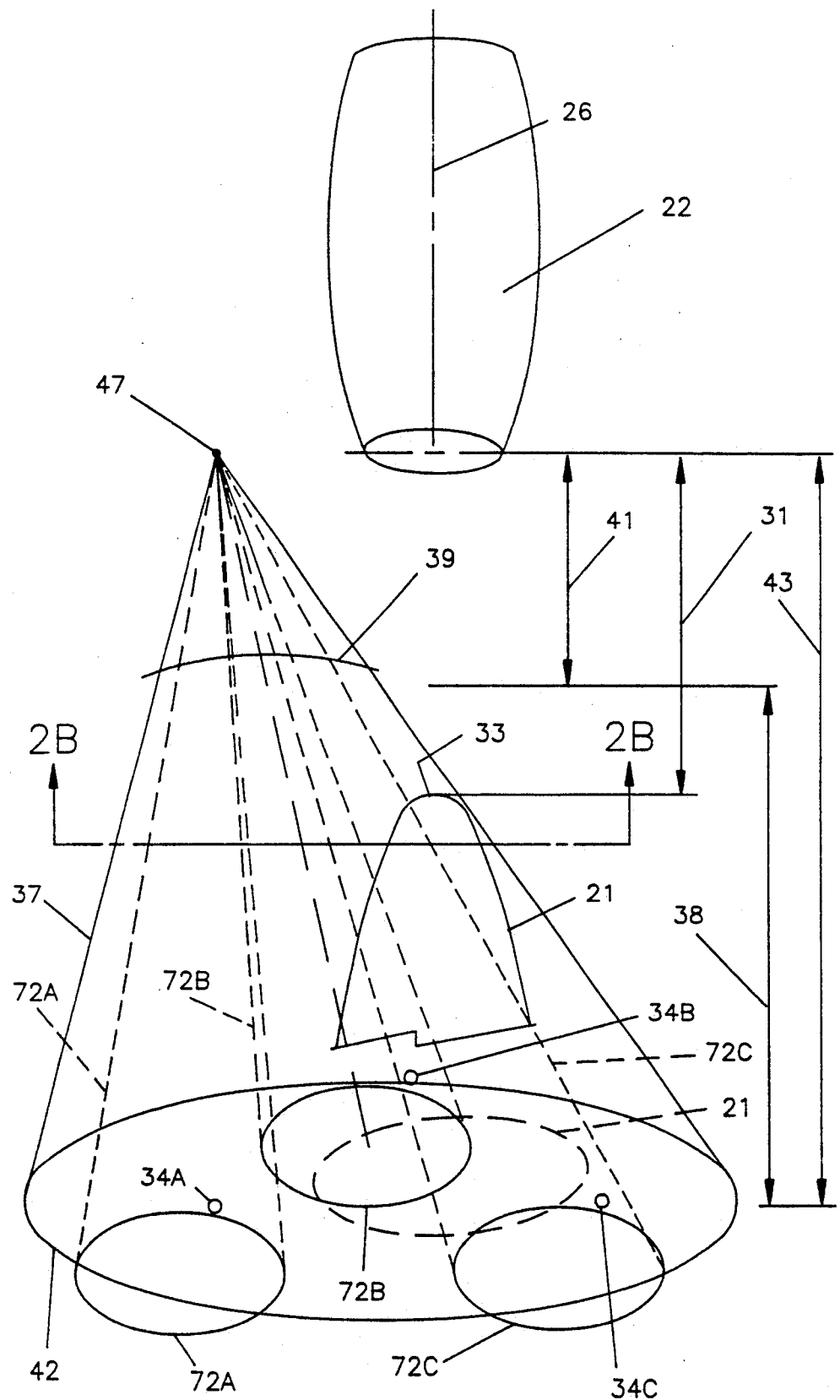
FIG. 2A is a view of the contrail forming behind the engine of the aircraft, showing a perspective view of a detection volume in which a contrail onset forms.

As shown in FIG. 2A, for purposes of description a detection volume 37 is shown behind the LOB engine 22 of the aircraft 20. The detection volume 37 is in the form of a truncated cone, having a selected distance 38 between one near end 39 at a given distance 41 from the LOB engine 22 (see arrow line 41) and a distant end 42 at a maximum distance 43 from the LOB engine 22 (see arrow line 43). The detection volume 37 is the volume which is interrogated by a system 46 of the present invention to determine whether a contrail 21 has formed behind any engine 22, such as the LOB engine 22, of the aircraft 20. One such detection volume 37 is aft of each engine 22 or 23 to determine whether a contrail 21 has formed behind that engine. An apex 47 of the frustoconical detection volume 37 is at the aircraft 20, and more particularly, adjacent to the LOB engine 22 in the system 46 of the present invention for detecting that a contrail 21 has formed behind that particular one of the engines 22. Thus, it may be appreciated that the detection volume 37 has selected dimensions, starts at the given distance 41 aft of the LOB engine 22, and ends at the far end 42 at the maximum distance 43 from the LOB engine 22.

Figure 4A:
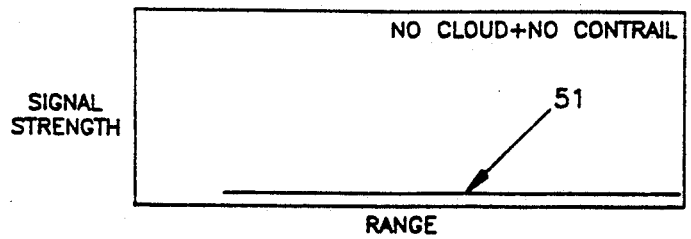
FIGS. 4A through 4G are graphs prepared by computer simulation based on the principles of the present invention, illustrating relative strength of processed return signals vs. range from the aircraft under different atmospheric and aircraft operational conditions, showing peaks in the processed return signal each time there is a contrail forming behind the aircraft, where

The location at which the onset 33 (i.e., the front portion of the contrail 21) forms depends on the above-described conditions. In general, those conditions occur such that as the aircraft 20 flies, the onset 33 will generally be between that given distance 41 and the maximum distance 43 from the aircraft 20, where the maximum distance 43 is at the distant end 42 of the detection volume 37. Further, as the aircraft 20 flies under stable atmospheric and engine conditions, the onset 33 will generally appear at about the same distance behind a particular engine 22 or 23 of the aircraft 20. That same distance situation is distinguished from a cloud 48 (FIG. 1) through which the aircraft 20 may fly. Referring to FIG. 1, as the aircraft 20 flies through the cloud 48 (shown at 48A at time $t_1$) and then past a leading edge 48L of the cloud (shown at 48B at time $t_2$ and at 48C at time $t_3$), the leading edge 48L of the cloud 48 will be spaced from the aircraft 20 by greater and greater distances (shown as distance 49B at time $t_2$ and distance 49C at time $t_3$) from the aircraft 20. This distinction is also illustrated in FIGS. 4A through 4G, which are graphs of signal strength versus distance (or range) aft of the aircraft 20. These graphs represent a profile 51, or first output signal of the system 46. In FIGS. 4F and 4G, the leading edge 48L is represented at the distance 49B at time $t_2$ (FIG. 4F) and at the distance 49C at the later time $t_3$ (FIG. 4G) as the aircraft 20 flies away from the leading edge 48L. In contrast to the cloud 48, even though the aircraft 20 is flying, under these conditions the point at which the onset 33 occurs (see the onset distance 31 in FIGS. 4C, 4D, and 4E) will appear to be generally stationary relative to the aircraft 20 and will be within the selected distance or length 38 (see arrow 38 in FIG. 2A) of the detection volume 37.

GENERAL DESCRIPTION OF SYSTEM 46

Figure 5A:
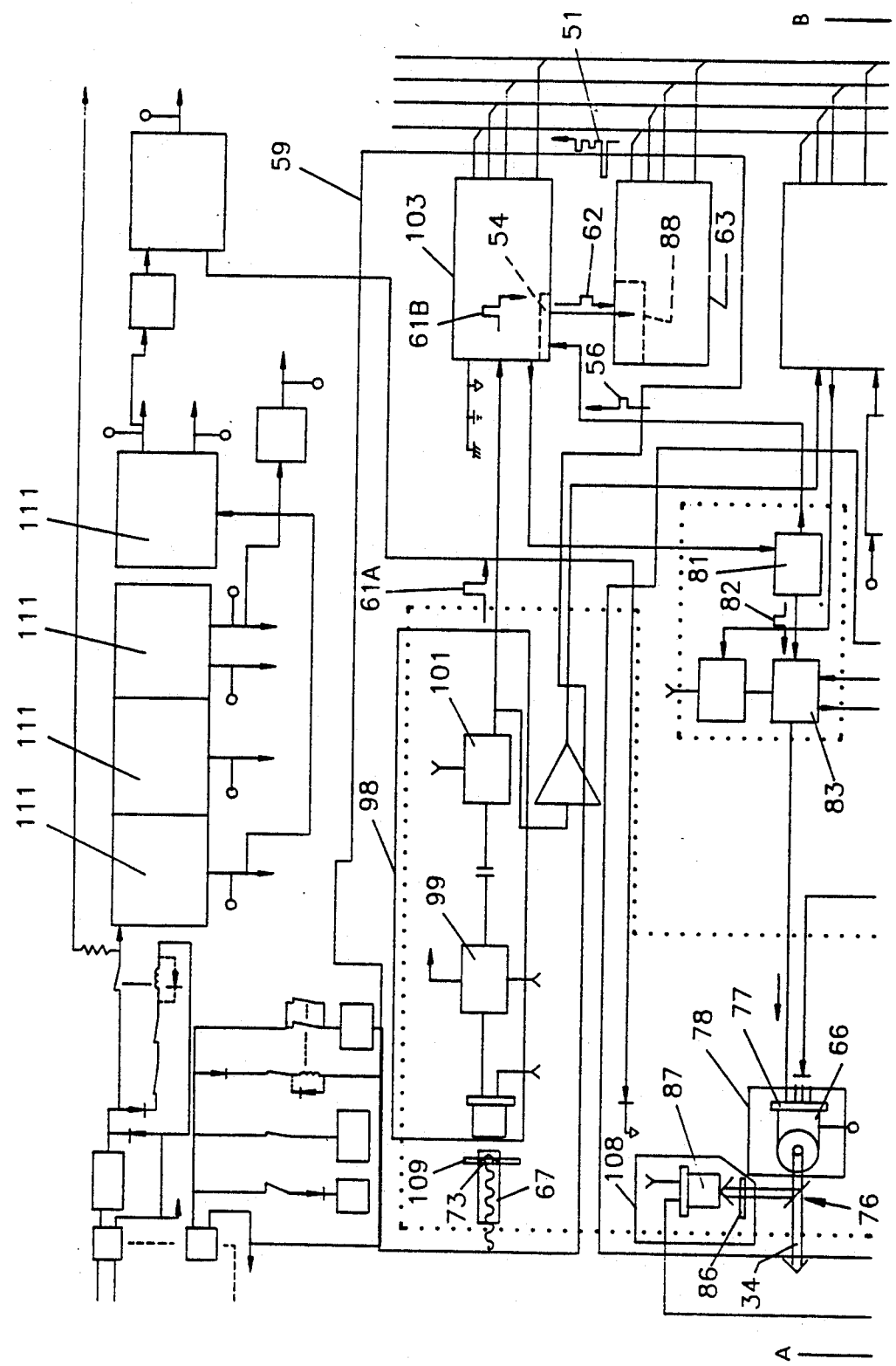
FIGS. 5A and 5B, when joined at lines AA and BB, form a schematic diagram of the elements of the system in the sensing pod of the aircraft.

The system 46 of the present invention may be provided for each engine 22 or 23. For each engine 22 or 23, the system 46 includes a generator 52 which transmits the laser beam 34 (which may be referred to as a lidar output signal) rearward of the aircraft 20. The lidar signal 34 is modulated according to a pseudorandom pattern 53 (FIG. 6A). The system 46 includes memory 54 (FIG. 5A) for a cross correlation pattern 56 "corresponding," as defined below, to the pseudorandom pattern 53. The generator 52 is mounted on the aircraft 20 for directing the lidar signal 34 along a movable output signal axis 57 (FIG. 3) rearwardly of the aircraft 20 and into the detection volume 37 (FIGS. 2A and 2B) of the respective engine 22 or 23 to intersect any contrail onset 33 which forms within the detection volume 37. As noted, the contrail 21, including its onset 33, and any clouds 48 in the detection volume 37, will scatter the lidar beam 34 back toward the aircraft 20. The scattered lidar beam 34 forms the return signal 36 (FIG. 3, see series of arrows 36 representing the return signal) having the pseudorandom pattern 53 (FIG. 6A). Also mounted on the aircraft 20 and rearwardly looking, into the detection volume 37 along a movable return signal axis 58 is a detector 59 which tracks the rearwardly directed lidar output signal 34. In response to the return signal 36 the detector 59 produces a count signal 61A (FIG. 5A) which is sampled (with a resolution of $\Delta t$) to produce a sampled count signal 61B, which is summed to form a histogram, which is represented by a resolved count signal 62 shown in FIG. 6B.

The system 46 includes a digital signal processor 63 for cross correlating the cross correlation pattern 56 with the histogram 62 to define the 51 which represents the amplitude of the return signal 36 correlated to the distance aft of the aircraft 20 from which the laser beam 34 was reflected. The profile 51 has a peak 64 (FIGS. 4C–4E) representing the onset distance 31 within the selected distance 38 of the detection volume 37, to indicate that a contrail 21 has formed as a result of operation of the corresponding one of the engines 22 or 23.

Figure 2B:
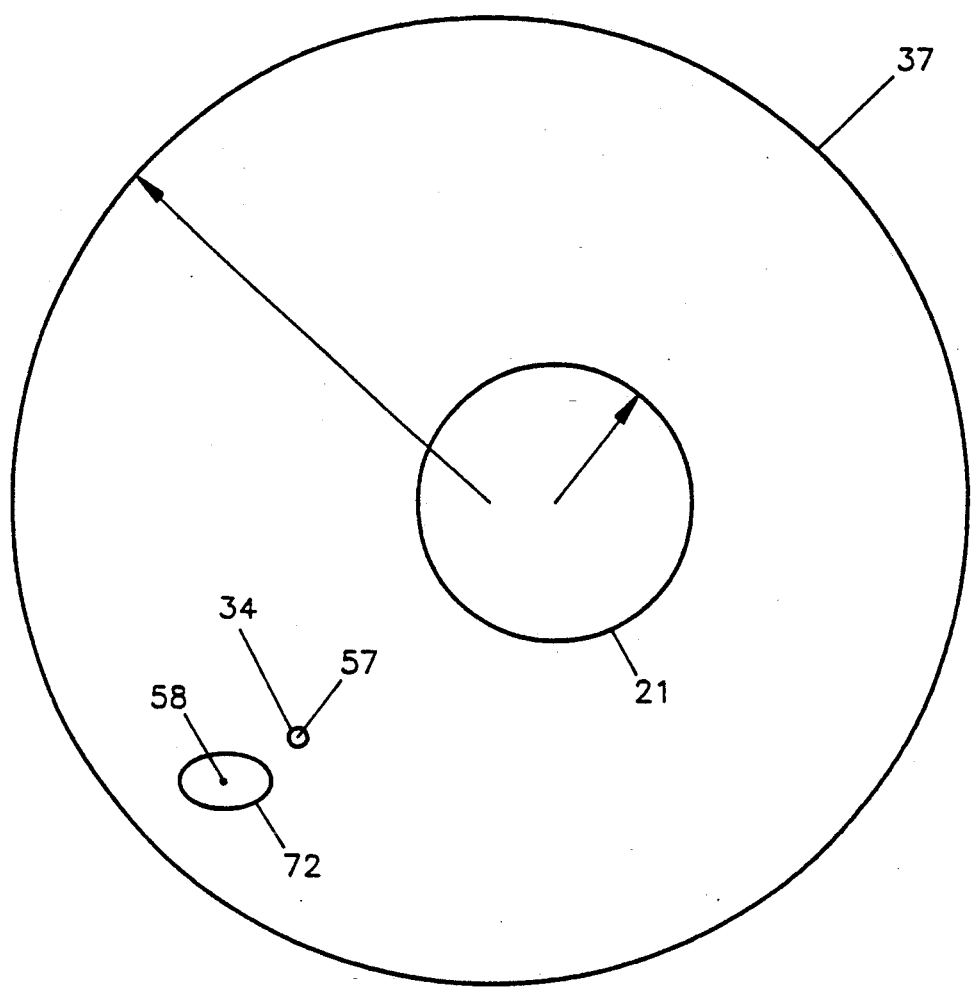
FIG. 2B is a sectional view taken along line 2B—2B in FIG. 2A showing the perimeter of the detection volume relative to a laser beam and a telescope field of view.
Figure 3:
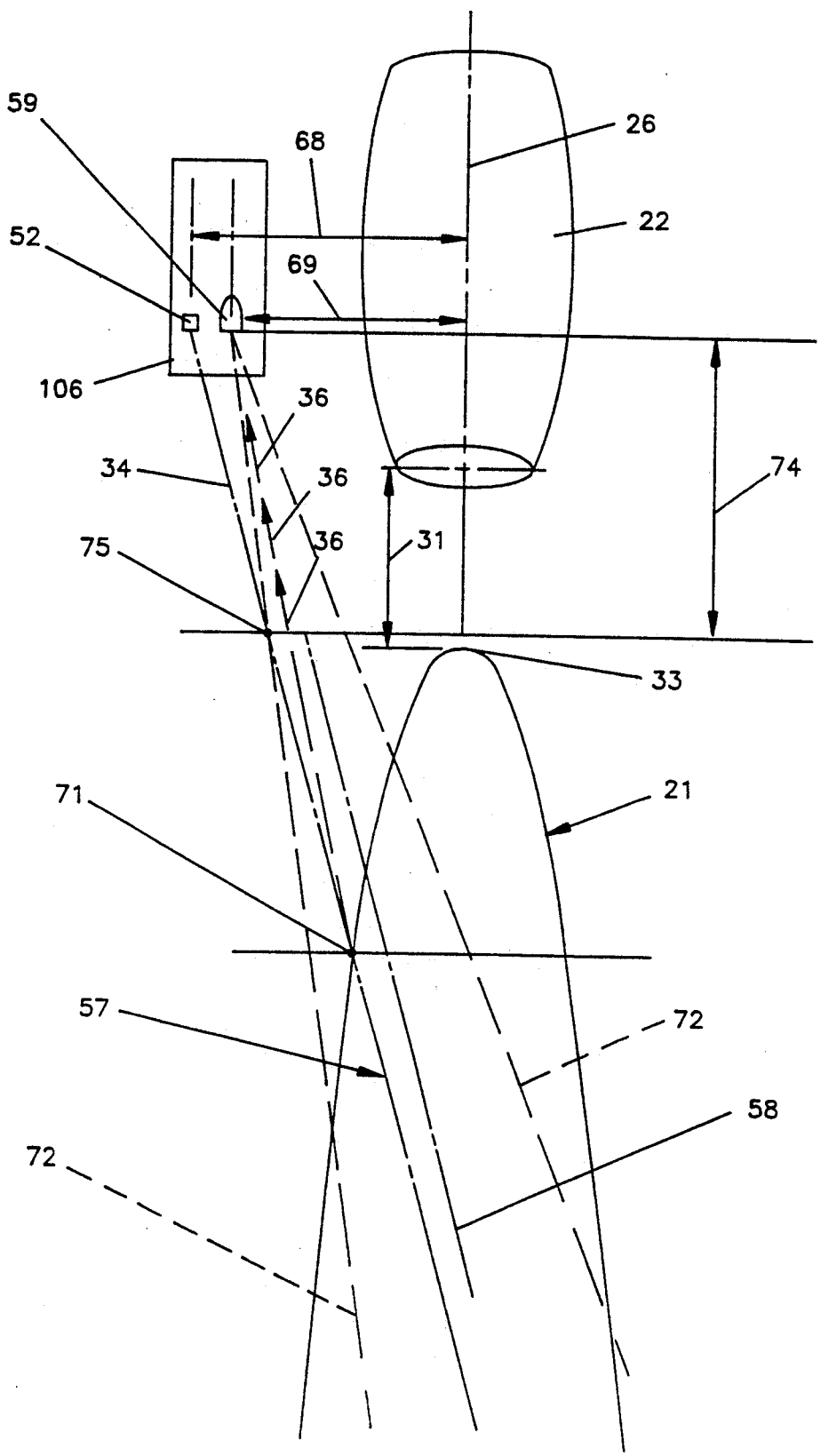
FIG. 3 is a view of one engine of the aircraft and a sensing pod of the system of the present invention, showing the laser beam directed at an angle from an axis of the engine toward the contrail, and a telescope for receiving a return signal scattered back toward the telescope by the contrail.
Figure 5B:
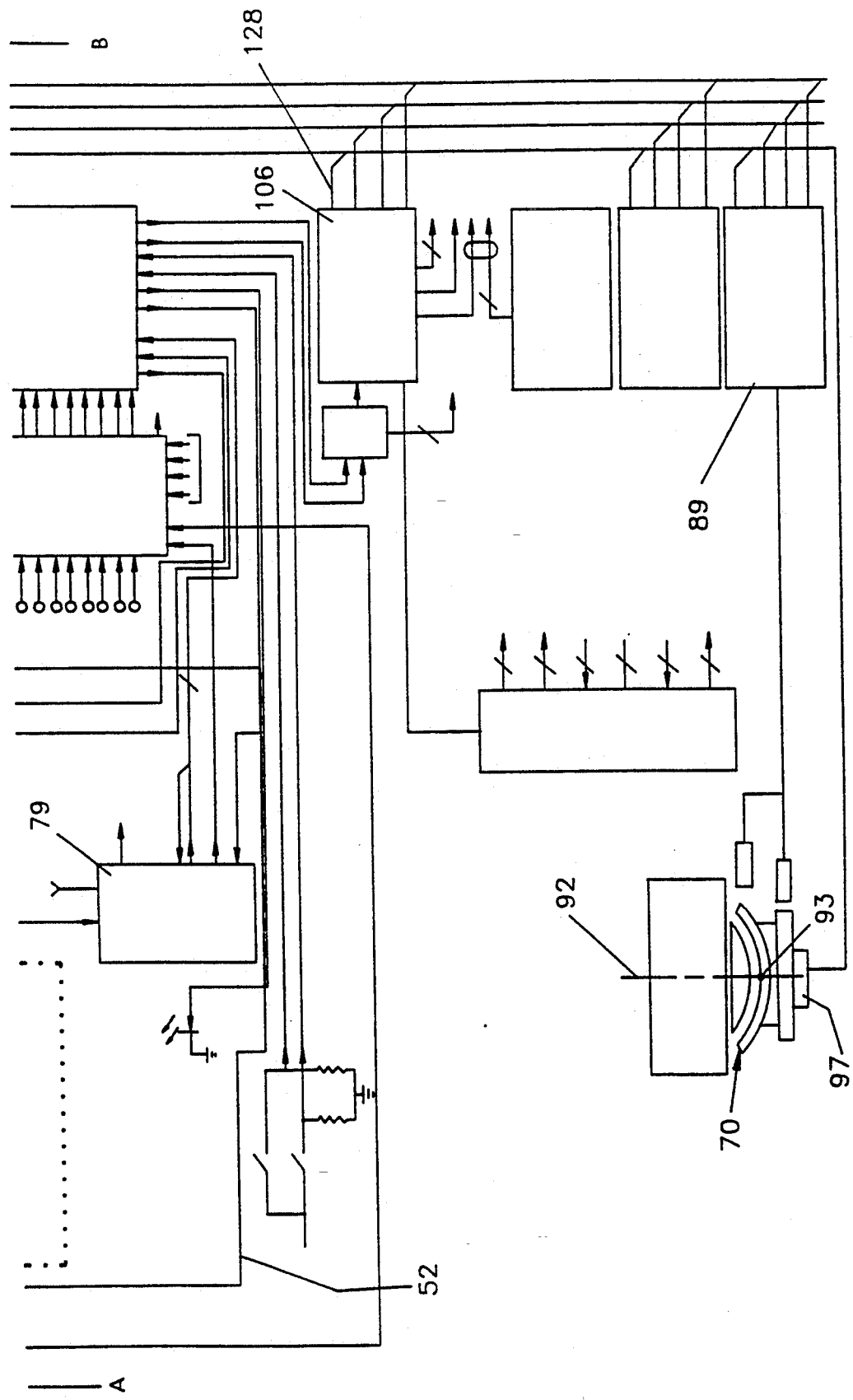

The generator 52 and the detector 59 shown in FIG. 3 are provided for each engine 22 or 23. Referring to FIG. 5A, the generator 52 includes an output laser 66 which is aligned with the output signal axis 57 (FIG. 3). The detector 59 includes a telescope 67 (FIG. 8B) aligned with the return beam axis 58 (FIG. 3). The laser 66 and the telescope 67, and the respective axes 57 and 58, are offset by different respective distances 68 and 69 from the axis 26, for example, of the engine 22. The laser 66 of the generator 52 and the telescope 67 are mounted on a common movable platform 70 (FIGS. 5B, 8A and 8B). Movement of the platform 70 causes the laser 66 to direct the output lidar signal 34 along the movable output signal axis 57 to sweep the output lidar signal 34 within the detection volume 37. The sweeping output signal 34 intersects the contrail 21 at a point 71, and/or is transmitted through a cloud 48. The point 71 is near the contrail onset 33. The exact location of the point 71 relative to the onset 33 will depend on such factors as the width of the contrail 21 and the direction at which the movable axis 57 is pointing. The output signal 34 is scattered back by the cloud 48, and/or the contrail 21 to produce sweeping of the return signal 36. Since the return signal 36 is scattered back from the contrail 21 as the output beam 34 enters and starts to penetrate the contrail 21, and since the contrail onset 33 is near the point 71, when the return signal 36 is processed to generate the profile 51 having the peak 64, the peak 64 identifies the point 71 near the location of the onset 33, and is said to represent the onset 33. The telescope 67 moves with the laser 66 on the common platform 70 in synchronism with the sweeping of the reflected (or backscattered) return signal 36. In this manner, the return signal 36 is sought from the general part of the detection volume 37 at which the output lidar signal 34 will intercept a contrail 21 if one exists in the detection volume 37. Referring to FIGS. 2A and 2B, it may be understood that in one position of the platform 70, an "A" position, the laser beam 34A and a telescope field of view 72A do not intersect the contrail 21. The platform 70 would have to be moved to a "B" or a "C" position for the laser beam 34B or 34C and the field of view 72B or 72C to intersect the contrail 21.

To avoid having the system 46 be detectible at a distance from the aircraft 20, the generator 52 causes the wavelength of the lidar output signal 34 to be a selected wavelength. The wavelength is selected to be both in the invisible range and highly absorbed by water vapor to limit the intensity of the lidar signal 34 transmitted beyond the detection volume 37 aft of the aircraft 20. As noted, the present invention provides separate contrail detection for each of the engines 22 or 23 of a multi-engine aircraft 20, e.g., a first of the systems 46 is provided for a first of the engines 22 and a second of the systems 46 is provided for a second of the engines 22 or 23. The lidar output signals 34 generated by the respective first and second systems 46 are modulated to have different pseudorandom patterns 53 (FIG. 6A), that is, patterns having no relative cross correlation. In this manner, there is no interference between the lidar output signals 34 for one engine 22 or 23 and those for the other engine, and the return signal 36 from the respective contrails 21 of the first and second engines 22 or 23 may be distinguished.

In greater detail, the generator 52 produces the output lidar signal 34 in continuous-wave form having a selected pseudo random pattern or output sequence 53. The detector 59 temporally groups the return signal 36 to form the resolved count signal 62. The output sequence is cross correlated with the resolved count signal 62 to generate the profile 51, which is an output of the system 46 indicative of the amplitude of the return signal 36 correlated with respect to distance between the aircraft 20 and the atmospheric condition (e.g., a contrail 21) from which the return signal 36 was scattered back toward the system 46. The detector 59 also determines whether there is the peak 64 in such output amplitude indicated by the profile 51. For a contrail onset 33 within the onset range 27, the distance 31 of the peak from the aircraft 20 is within the onset range 27 and indicates that a contrail 21 is resulting from operation of the aircraft 20.

The output lidar signal 34 is directed along the movable output signal axis 57. The telescope 67 is provided with an aperture 73 (FIG. 5A) to admit only that portion of the backscattered return signal 36 which is returned along the movable return signal axis 58. A bistatic arrangement of the generator 52 relative to the detector 59 limits the return signal 36 to that received from not less than a minimum distance 74 (FIG. 3) from the detector 59.

DETAILED DESCRIPTION OF CONTRAIL/SYSTEM RELATIONSHIP

As described above, applicants have concluded that in the relatively short range (distance 43 up to one hundred meters behind the aircraft 20) there will be the peak 64 in the profile 51 after detection and processing of the return signal 36 backscattered from the contrail 21 near the onset 33. For purposes of understanding the system 46 of the present invention, reference is made to FIGS. 4A through 4G. These FIGS. result from computer simulation of various conditions of cloud 48 and contrail 21 formation. The simulation was based on the description below of the processing of the count signal 61A, which is generated in response to the return signal 36, which may have various amplitudes according to the various conditions. Thus, via computer simulation, FIGS. 4A-4G represent the profiles 51 of intensity versus distance (or range) from the aircraft 20. All of FIGS. 4A through 4G have had a multiplicative factor proportional to the square of range (bin) distance applied for ease of discussion. These FIGS. thus represent target backscatter cross section (i.e., fraction of incident laser beam 66 scattered back toward the aircraft 20 per unit of distance of travel of the laser beam 34), rather than raw return beam strength.

Figure 4B:
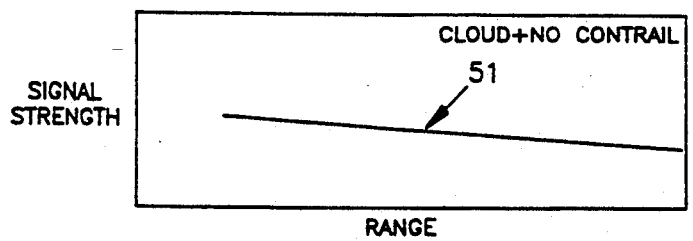
Figure 4C:
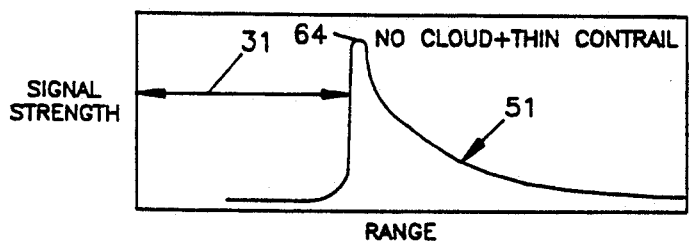
Figure 4D:
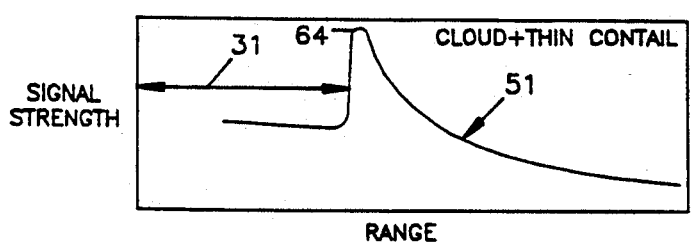
Figure 4E:
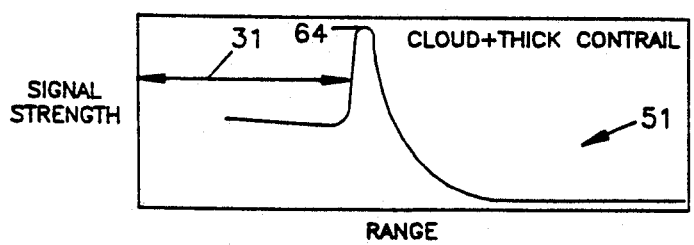
Figure 4F:
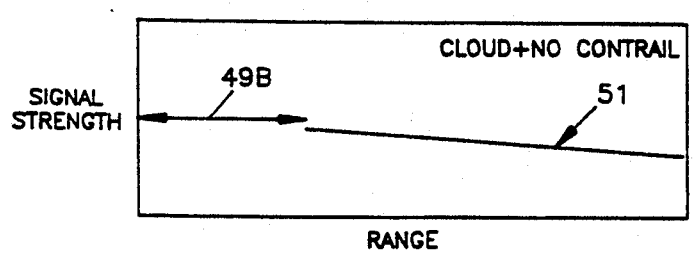
Figure 4G:
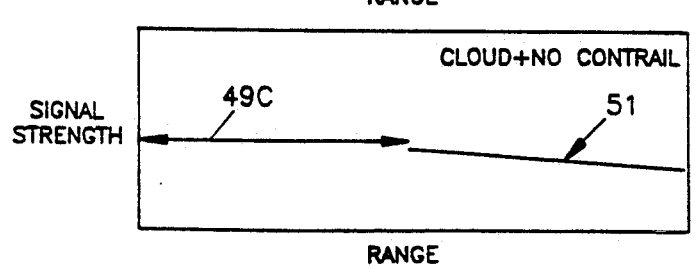

Initially, the aircraft 20 is flying through a cloud 48 in the simulated situations illustrated in FIGS. 4B, 4D and 4E. The cloud 48 results in a return signal 36, but in none of these FIGS. is there any resolved count signal 62 at very close ranges. The return signal 36 begins well before the closest range (see near end 39 of detection volume 37 in FIG. 2A) of contrail formation onset 33. Due to the bistatic nature of the system 46 (described in more detail below) the system 36 does not respond to the very strong return beam 46 which is backscattered from very close range (e.g., the minimum distance 74 from zero to ten meters behind the aircraft 20.)

In this regard, the amplitude of the return signal 36 scattered back from non-beam-filling targets, such as a laser-illuminated spot on the contrail 21, falls off as one over the second power of target range. FIG. 4A shows that there is no profile amplitude at any range in the absence of both cloud and contrail. FIG. 4B shows that there is significant profile amplitude at all ranges in the presence of natural cloud 48 without any contrail 21. Clouds 48 can occur both near and far from the aircraft 20, thus the profile amplitude extends over a long range.

FIG. 4C shows the profile 51 derived from an optically thin contrail 21 in the absence of natural cloud 48. The contrail 21 suddenly appears at some range (the onset distance 31) behind the aircraft 20. The profile amplitude decreases with increasing range due to the extinction of the lidar signal 34 by the highly reflective contrail particles. Since FIG. 4C represents optically thin contrails 21, the laser beam 34 is not rapidly attenuated, and the return signal 36 is detected even from distant portions of the contrail 21. This sudden contrail onset 33 at a specific range (onset distance 31) assists in unambiguously identifying a contrail 21, and with the range-resolving capabilities of the present system 46 there is increased contrail-detection probability and a reduction in false alarms due to natural cloud 48. There is also significant information content in being able to observe the rate of contrail 21 dissipation behind the aircraft 20.

FIG. 4D shows the range-variable profile 51 derived from an optically thin contrail 21 in the presence of natural cloud 48. Note that the profile 51 discriminates the cloud 48 and the contrail 21 via the peak 64 even though both the cloud 48 and the contrail 21 are present in the field of view 72 of the telescope 67.

FIG. 4E shows the profile 51 which would be produced by the system 46 in response to an optically thick contrail in the presence of natural cloud 48. Here, contrail ice crystal concentrations are large enough to rapidly deplete the lidar output signal 34. A very large return signal 36 is recorded at close range, near the contrail onset 33. Signal strength from distant portions of the contrail 21 is minimal.

Several important conclusions can be drawn from the general characteristics of the profiles 51 shown in FIGS. 4A-4G and the aircraft/contrail geometry shown in FIG. 3. Recall from FIG. 3 that the contrail onset 33 can occur quite close to the aircraft 20. If the system 46 were to rely on detection of the return signal 36 scattered back from a single point, for example, a point one hundred meters behind the aircraft 20, the resulting profile 51 would not effectively discriminate a cloud 48 from a contrail 21 under all atmospheric conditions. If the profiles 51 of FIG. 4C, D, and E indicate contrail onset 33 at twenty meters, for example, profiles 51 produced in response to single-point backscatter signals 36 reflected from one hundred meters would be ambiguous. That is, single-point techniques cannot distinguish optically thin contrail return signals 36 from return beams 36 produced by a cloud 48. Worse yet, when the contrail 21 is optically thick and forms closer to the aircraft 20 than illustrated in FIG. 4E, the strength of the output signal 34 can be sufficiently attenuated that the return signal 36 produced from the one hundred meter range results in the intensity of the profile 51 being insignificant. In this instance, the single-point measurement technique will not detect the contrail 21, even though it is highly visible. Thus, range-resolution of the count signal 61 is important to both the proper identification of contrails 21 and the elimination of cloud false alarms.

DETAILED DESCRIPTION OF SYSTEM/CONTRAIL GEOMETRY

Referring to FIGS. 3, 5A and 5B, the bistatic design of the system 46 may be appreciated. The generator 52 of the system 46 includes the laser 66, which may be a laser diode which is mounted at the generator offset distance 68 from the engine axis 26. The laser output beam 34 is transmitted along the movable axis 57 rearwardly of the engine 22 toward the contrail 21. The output beam 34 is shown intersecting the contrail 21 at the point 71 at about forty-five meters from the LOB engine 22.

The detector 59 includes the telescope 67 having the field of view 72 for receiving the return signal 36. The telescope field of view 72 is centered on the movable laser axis 58, which is offset from the engine axis 26 by the detector offset distance 69, which is different from the generator offset distance 68. As a result, the telescope field of view 72 intersects the output laser beam 34 at a point 75 no closer than ten meters (see minimum distance 74 in FIG. 3) from the LOB engine 22, such that no return signal 36 reflected from a distance closer than ten meters from the engine 22 will be received by the detector 59. The given distance 41 aft of the LOB engine 22 is no less than the minimum distance 74 shown in FIG. 3.

The minimum ten meter distance 74 of the intersection point 75 avoids saturation from very close range atmospheric particles. Because the amplitude of the return signal 36 is proportional to one over $r^2$, if the return signal 36 reflected from distances closer than ten meters were allowed to enter the telescope field of view 72, that very near return signal 36 would have too high an amplitude relative to the return signal 36 from within the detection volume 37, and the detector 59 would saturate. Thus, the bistatic design is used to prevent backscatter return signal 36 reflected from distances less than the minimum ten meter distance 74 from entering the telescope field of view 72.

The contrail 21 is shown in FIG. 3 having an onset 33 at about thirty meters aft of the engine 22 (see onset distance 31). The output beam 34 is shown intersecting the contrail 21 at the point 71 aft of the onset 33 at about forty-five meters aft of the LOB engine 22. The point 71 is within the field of view 72. Thus, the backscattered return signal 36 is received by the detector 59.

When the distance 41 (start of detection volume 37) equals the distance 74 (i.e., ten meters) and with the geometry shown in FIG. 3, a cloud 48 as close as ten or more meters aft of the engine 22 will be detected, and a contrail 21, which generally would have an onset 33 no closer than forty-five to meters aft of the engines 22 or 23, and which may have an onset 33 as many as one hundred meters aft of the engine 22, will be detected.

In contrast to the system 46, a fixed range detector (not shown) could, for example, be set to detect a contrail 21 only at one hundred meters aft of the engine 22. If the contrail 21 is "heavy", i.e. has a high concentration of ice crystals, the output beam 34 would be attenuated substantially before reaching one hundred meters aft of the aircraft 20, such that a weak, if any, return signal 36 would return to the detector 59 from the contrail 21 and would give a false representation of the contrail state. On the other hand, a fixed range detector set at forty-five meters would detect the contrail 21 shown in FIG. 3, but would not detect a contrail 21 having an onset 33 at, for example, seventy meters aft of the engine 22.

DETAILED DESCRIPTION OF SYSTEM 46

Laser Diode 66

Referring to FIGS. 5A and 5B, the generator 52 of the system includes the laser diode 66 having a single spatial mode output and an 823 nm wave-length. Optics 76 (FIG. 5B) for transmitting the laser output signal 34 provide the output signal 34 in the form of the beam with a 2 cm diameter having a beam divergence less than one times ten to the minus seventh power, which is a very highly collimated beam. In particular, the diameter of the beam of the output signal 34 at a distance of ten miles from the aircraft 20 is less than twenty feet. The 823 nm beam wavelength is in a strong water-vapor atmospheric absorption band. In a preferred embodiment of the present invention, the laser diode 66 is fabricated by Spectra Diode Labs and has a wavelength specification of 823 nm plus or minus 5 nm. The 823 nm output signal 34 may be transmitted through the atmosphere to propagate rearward from the aircraft 20 for the maximum distance 43 to the particles of the contrail 21, which backscatter the output signal 34 and form the return signal 36. On the other hand, the total water vapor in the atmosphere almost totally absorbs the radiated output beam 34 before it can be transmitted to reach a distant observer or the ground. In greater detail, considering a cruising altitude of 29,000 feet of the aircraft 20, the transmission of such output signal 34 to the ground approaches zero.

The laser diode 66 may be a GaAlAs laser diode, which is a very rugged, and highly dependable, solid state device. The volume of the laser diode 66, including a thermoelectric cooler 77 (FIG. 5A), is less than one cubic inch. The laser diode 66 is placed in a separate internal temperature-controlled enclosure 78. The output wavelength of the laser diode 66 is temperature controlled to coincide with a water vapor absorption wavelength. Such control is provided by a thermoelectric temperature controller 79 connected to the cooler 77 of the laser diode 66. The laser diode 66 may be a Spectra Diode Labs Model SDL-5412-H1 which emits 100 mW of power.

The laser diode 66 is modulated by controlling the input current. The modulation pattern is programmed into an Adtron DGS card or similar data generator card 81 for IBM PC/AT compatible computers. The card 81 produces a data sequence up to a 20 MHz rate. The output 82 from the DGS card 81 controls an operational amplifier 83 which drives the laser diode 66. In this way the modulation pattern can be easily modified by simply programming another sequence into the DGS card 81. The same DGS card 81 can be used to control multiple laser diodes 66.

The continuous output of the laser diodes 66 is 100 mW, but with random-modulation this is reduced to 50 mW. The output power is further reduced to 20 mW average power by the collimating optics 76 and losses of a window 84 (FIG. 8B). The laser diode 66 is stabilized to the same 1 nm band. This is accomplished by using window scatter feedback through a one nm band pass interference filter 86 which is identical to a filter 109 used with the detector 59. The feedback is monitored using a photodiode 87 and is used to select the temperature of the laser diode 66.

The laser diode 66 produces the beam 34, which is near diffraction limited and collimated by the collimating optics 76 to have a footprint which is 1 cm by 3 cm. Using Gaussian beam calculations, this translates into a beam divergence of less than $2 \times 10^{-7}$ sr. However, the minimum beam divergence is limited by how accurately the collimating optics 76 is positioned. A divergence below $10^{-4}$ steradians using Gaussian beam calculations is maintained.

MODULATION OF LASER DIODE 66

The laser diode 66 is a rapidly modulated quasi-continuous wave (RM CW) device. The modulation of the laser diode 66 causes the laser diode to operate in a series of ON and OFF states (FIG. 6A) with a selected temporal width in a sequence which appears random. However, the sequence is chosen to have properties which allow ranging information to be recovered from the scattered laser beam 34. The ON and OFF states in the sequence are represented by a set of numbers $a_i$ ($i=1$ to N, where N is the length of the sequence) which are correspondingly one and zero (laser ON or OFF, respectively). The simplest choice for the pattern of ON and OFF states is called the Maximum Length Sequence or Code (M-code) sequence. Such M-codes are described in *The Radar Handbook*, Second Edition, by Donald G. Fink, Editor in Chief, at pages 10.19 and 10.20. In a preferred embodiment of the present invention, use is made of an M code selected from Table 10.5 on page 10.20 of *The Radar Handbook*, as follows:

| Number of stages | Length of maximal sequence | Number of maximal sequences |
| --- | --- | --- |
| 3 | 255 | 16 |

Other sequences (e.g. an A-code or an A1-code) may be used to give better signal to noise ratios. Such an A-code is composed of two interleaved M-codes in which every other bit is inverted (in the sense that zeros are changed to ones and ones are changed to zeros). The A1-code is formed from two interleaved M-codes, having equal numbers of ON and OFF states. The A-code and A1-code give lower background noise than the M-code, and they have zero cross-correlation. This allows the two A-code and A1-code sequences to be used simultaneously without interfering with each other. Several such sequences display this same non-interference property, enabling several contrails to be monitored concurrently with a single RM CW lidar laser diode 66.

In greater detail, the procedure for generating the M-code pattern or sequence is described in an article entitled Random Modulation CW Lidar, by N. Takeuchi, et al., *Applied Optics*, Vol. 22, No. 9, 1 May 1983 (Takeuchi 1983). While the laser diode 66 is operating, the sequence is continually repeated with no breaks. The ON and OFF sequence is represented by the set of numbers $a_i$ which are either one or zero. For purposes of illustration, the ON and OFF sequence of the laser diode 66 is represented by the curve in FIG. 6A, which is a graph of power versus time increment (noted as "state number"). A second sequence is of the same length and is generated by replacing the zeros in the $a_i$ sequence with minus one. This sequence is referred to by $a'_i$.

The output sequence is repeated many times, with each sequence being two hundred fifty-five states (ON or OFF) long. The return signal 36 resulting from the laser beam 34 scattered back during a laser diode emission sequence is detected by the detector 59. The count signal 61A (FIG. 5A) is sampled (with a resolution of $\Delta t$) to form the sampled count signal 61B. The sampled count signal 61B is summed to form the histogram (shown in FIG. 6B), which is referred to as the resolved count signal 62.

CROSS CORRELATION

Figure 6C:
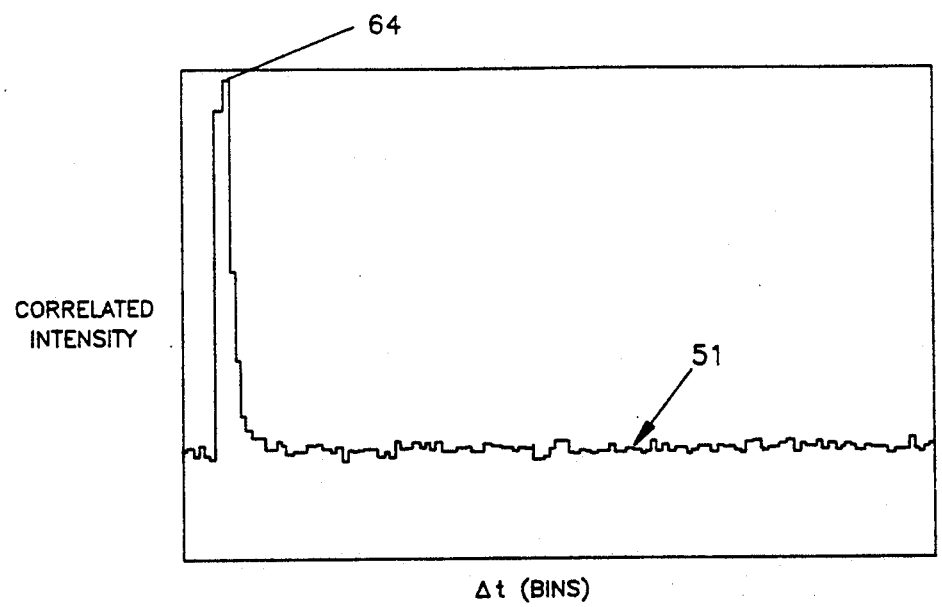
FIGS. 6A through 6C are graphs showing the temporal relationships among a laser beam and certain signals derived from a return signal (the reflection of the laser beam off atmospheric phenomena aft of the aircraft), where

The use of the Maximum Length Sequences enables the resolved count signal 62 to be processed to produce the amplitude versus distance profile 51 (FIG. 6C). The cross correlation pattern 56, consisting of positive and negative ones corresponding to the pseudorandom pattern 53 (i.e., the ON and OFF states of the laser diode 66), is stored in the memory 54 (FIG. 5A) of the digital signal processor (DSP) 63 and used to convert the histogram 62 into range data. The conversion is by the DSP 63 performing a cross-correlation between the stored positive and negative one sequence and the measured histogram data. The cross-correlation is thus between the $a_i$ and $a'_i$ sequence and gives a delta function. This is expressed mathematically as $$\Psi_j = \frac{1}{N} \sum_{i=0}^{N-1} a_i a'_{i-j} = \begin{cases} 1, j = 0 \bmod N \\ 0, j \neq 0 \bmod N \end{cases} \quad (1)$$

where $\Psi_j$ is the result of the cross-correlation. When evaluating this function, the cyclic definition $a_{i+N} = a_i$ is used.

The following is an example of how the cross correlation and the delta function are used to extract range information from the data. For this example, a single source of scatter (e.g., an onset 33) is located in the tenth range bin at sixty meters from the aircraft 20. For this case the resolved count signal 62 (based on the count signal 61A from the detector 59) will have the same temporal profile as the emitted laser beam 34 except that the pattern will be shifted by ten bins. If $s_i$ is the resolved count signal 62, then the resolved count signal 62 will be given by $$s_i = A \, a_{i-10} \quad (10)$$

where A is a proportionality constant which includes the output power of the laser 66, collection solid angle of the telescope 67, loss of the window 84, number of sweeps added and the backscatter coefficient; "i" is the time index; and "i−10" indicates the shift (or delay) by ten bins. The profile 51 is now obtained by performing the cross correlation between the set of numbers $s_i$ and the sequence $a'_j$ which is $$\Psi_j = \sum_{i=0}^{N-1} s_i a'_{i-j} \quad (3)$$

For this example, Equation 2 is substituted into Equation 3 to give $$\Psi_j = A \sum_{i=0}^{N-1} a_{i-10} a'_{i-j} \quad (4)$$

As expressed in Equation 1, the a and a' sequences are delta correlated so the sum in Equation 4 (which is the profile 51) will give a nonzero result only when j=10, or in other words only the tenth range bin will be nonzero. Similarly, if an atmospheric phenomenon reflects the laser beam 34 to result in the resolved count signal 62 stored in more than one range bin, the resolved count signal 62 will be a superposition of several $a_i$ sequences delayed by different amounts. When the cross-correlation is carried out each atmospheric phenomenon will again contribute to only its appropriate range bin.

In addition to recovering range information, the cross correlation process also removes background noise. Because the background noise is random and uncorrelated with the a' sequence, it is subtracted out. The correlation procedure is also effective in reducing non-random electronic noise which is uncorrelated with the sequence.

DETECTOR TELESCOPE 67

The telescope 67 is a 5 cm telescope which has been vibration and flight tested, such as those available from Hardin Optical Co. The system 64 uses the aperture 73 (FIG. 5A) for the telescope 67 to prevent stray light which is scattered off the telescope window 84 from entering the detector 59.

The platform 70 (FIGS. 5B and 8A) is used to rapidly track the contrail 21 by moving the laser diode 66 and the telescope 67 so the respective movable axes 57 and 58 are moved through angles of +5° within the detection volume 37 (see FIG. 2A which shows three positions, noted as 72A, 72B and 72C, of the field of view 72). The platform 70 is controlled by a signal generator 89 which generates signals for rotating the platform on respective vertical and horizontal axes 92 and 93 (FIG. 5B). As the platform 70 moves, the output beam 34 is swept across a wide range of angles, preferably encompassing the +5° of the detection volume 37. This enables use of contrail profiling and/or search patterns to locate the contrail 21. For example, a search pattern may be a vertical scan followed by a horizontal scan, and then by a more complete pattern moving across the entire cross-section of the field of view 72. If no peak appears in the profile 51 as such search pattern is followed, then the amplitude of the profile 51 indicates either no cloud 48 nor contrail 21 (FIG. 4A) or cloud 48 but no contrail 21 (FIG. 4B). The position of the output beam 34 is monitored by a data collection system 97 for subsequent analysis.

PHOTON COUNTER 98 OF DETECTOR 59

For rapidly counting the photons of the return signal 36, a photon counter 98 is used. The counter 98 may be either a photomultiplier tube (PMT) or an avalanche photo diode (APD). The APD of the counter 98 is a solid state device with a high quantum efficiency so that 32% of the photons hitting the diode are counted. The APD is operated below the diode breakdown voltage. For rapid photon counting, the APD is limited because once a photon is detected there is a 200 ns dead time before another photon can be detected. The PMT has a lower quantum efficiency (10%) but can detect multiple photons at once. In addition, the PMT has a detector gain which is between $10^5$ to $10^6$ compared with 100-200 for an APD. In a preferred embodiment of the system, a counter 98 having a PMT (Model R666SP) purchased from Hamamatsu Photonics is used. This is complete with preamplifier 99 and amplifier 101, for example, for removing false counts (which are smaller than the typical output generated by one photon), and generate the count signal 61A.

PROCESSING DETECTOR OUTPUT

The system 46 has three processors (a time of flight 103 processor 103, the DSP 63 and a control processor, or EXEC, 106) which operate simultaneously. In a preferred embodiment, the control processor 106 is a computer sold under the "KMS" trademark. This is a rugged MIL-STD-810C vibration and MIL-STD-461C and 462 EMI/RFI tested computer used for controlling aircraft-mounted instruments in military environments. The system 46 is physically located in a wing pod 107 (FIG. 3) on the aircraft 20.

Photon counts represented by the count signal 61A from the photon counter 98 are stored by the time of flight processor 103 which may be the Model PI9825 sold by Precision Instruments. The count rate is in the 10 million counts per second range. The record length used for the time of flight processor 103 is at least one modulation sequence of the laser beam 34, and is preferably thirty-two sequences long, with each sequence being 510 channels, or $\Delta$ts. It may be recalled that the output sequence was described as being two hundred fifty-five states long. The 510 channels result from taking a sample twice during each of the 255 states. The sampling is at a 50 MHz rate. The time of flight processor 103 is set for a record length of 16,384 measurements, of which 16,320 are used. The beginning of each acquisition sequence is synchronized with the beginning of a laser beam modulation sequence. Thus, there are 16,320 measurements, or separate $\Delta$t intervals, in the count signal 61A, which is processed by the time of flight processor 103.

Figure 6B:
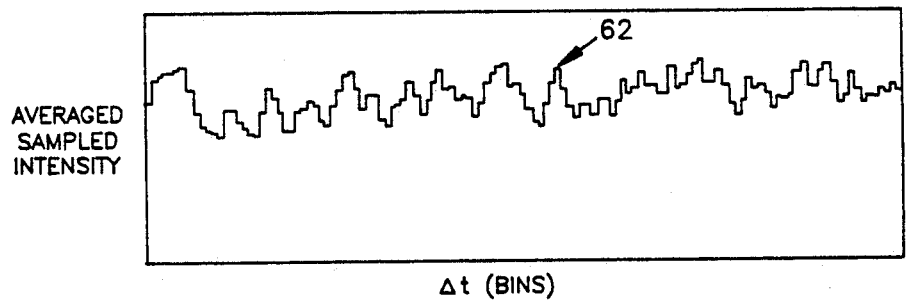
Figure 6A:
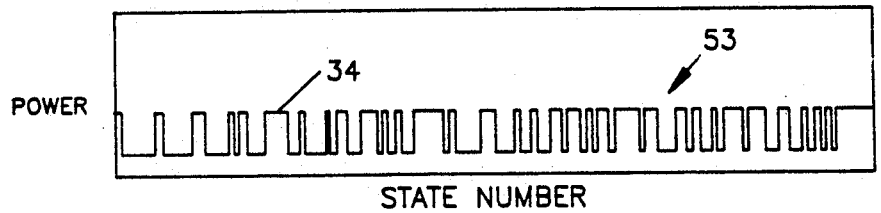

The time of flight processor 103 is capable of summing 256 sweeps of the record length of 16,384 channels (or measurements). The record length is long enough to contain the thirty-two repetitions of the 510 channels. Each sample taken in each sweep is converted by an A/D converter (not shown) using a zero to 255 scale and is accumulated. Each subsequent sample is added to the prior accumulated samples which correspond to the subsequent sample. The time of flight processor 103 outputs the sum of the samples taken for each $\Delta$t for processing by the DSP processor 63. Thus, it can be understood that the time of flight processor 103 temporally groups the return signal 36, where a temporal group corresponds to one $\Delta$t interval. The output of the time of flight processor 103 is the resolved count signal 62 which represents the sum of the intensities of the return signal 36 during each bin, or $\Delta$t, into which the signal 36 is divided. A graph of the resolved count signal 62 is shown in FIG. 6B.

The DSP 63 may be a Motorola DSP96002 mounted on an Ariel DSP-96 card. The DSP processor 63 then collapses the data into a single 510 channel data set and performs the cross correlation described above with respect to Equations 1 through 4, using the cross correlation pattern 56 (FIG. 5A) and the resolved count signal 62.

THE EXEC 106

Figure 9:
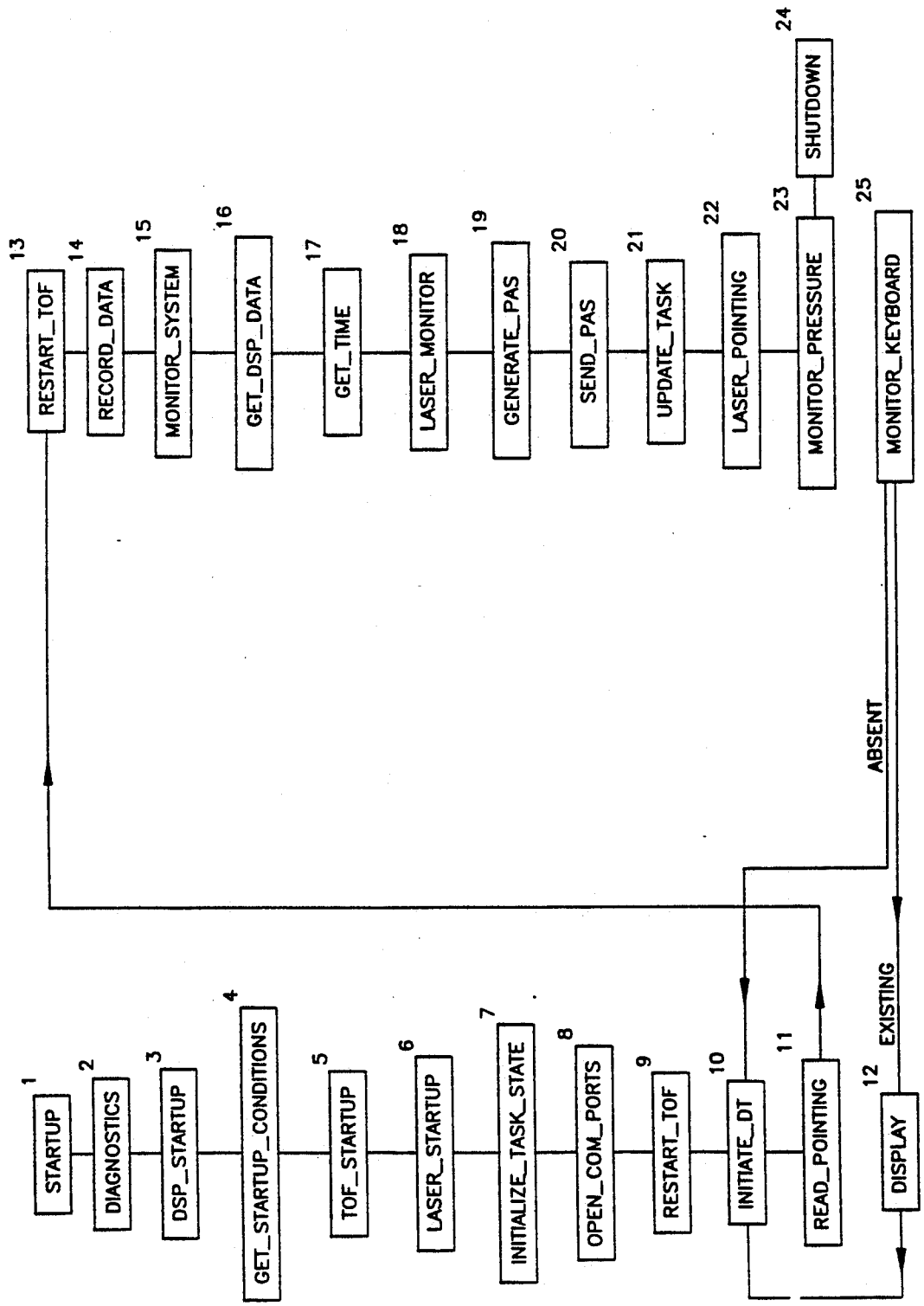
FIG. 9 is a flow chart illustrating the functions performed by an EXEC (or control) processor.

The EXEC 106 is the master controller of the system 46 and performs the following functions (see FIG. 9 where the following Steps 1-25 are shown). To enable the EXEC 106 to write or read data directly to or from the DSP processor 62, the EXEC 106 has been provided with the addresses of various arrays in the memory 88 of the DSP processor 62.

Startup: In Step 1, executes a standard loading of the DOS operating system.

Diagnostics: In Step 2, checks the output voltages of the various power supplies 111 (FIG. 5A) required for operation. Also checks the temperature at several locations in the lidar housing 78.

DSP_Startup: In Step 3, loads the correlation and data analyzing routines and subroutines described below (rmv_DSP, send_addr, corr(), addmask(), discrim(y[]), findpeak(), trap() and dis()) into the memory 88 of the DSP processor 63. Also initializes the mode of operation of the DSP processor 63.

Get_Startup_Conditions: In Step 4, the DSP processor 63 returns to the control processor 106 the addresses in the memory 88 where it writes the resolved count signal 62. The control processor 106 is thus enabled to retrieve the signal 62 when needed by reading the DSP processor's memory 88 at the appropriate address. Also, the control processor 106 is enabled to write data, including the signal 62, directly into such memory 88 without any I/O operation, for example.

TOF_Setup: In Step 5, various parameters are passed to the time of flight processor 103, such as sweep record length, number of sweeps to average, and amplifier gain. These parameters tell the time of flight processor 103 how to collect and average the data necessary to generate the histogram 62.

Laser_Startup: In Step 6, turns on the thermoelectric cooler 77 and the laser 66, and verifies that the laser 66 is ON. Monitors the power output of the laser 66 at a laser monitor detector 108 (FIG. 5A), which includes the photodiode 87 which has the interference filter 86 in front of it. The filter 86 has the same band pass as a filter 109 in the telescope 67. By monitoring the laser power the control computer 106 determines if the laser 66 is operating at the correct wavelength. When the wavelength has stabilized, the computer 106 continues to the next function.

Initialize_Task_State: In Step 7, the task state indicates which pointing pattern for the laser 66 is being requested (e.g., horizontal scan), and initializes the pointing pattern.

Open_Com_Ports: In Step 8, activates and formats serial and parallel communication ports (not shown) provided by the control processor 106.

Restart_TOF: In Step 9, commands the time of flight processor 103 to begin collecting a set of data from the count signal 61A.

Initiate_DT: In Step 10, tells the time of flight processor 103 to send the resolved count signal 62 to the DSP 63. "DT" refers to a bus 117 which conforms to the DT-Connect standard.

In a preferred embodiment of the present invention, the bus 117 conforms to the bus standard defined by Data Translation, Inc. Both the DSP processor 63 and the time of the flight processor 103 implement the DT-Connect standard.

Read_Pointing: In Step 11, determines the angle relative to the horizontal axis 93 and the vertical axis 92 at which the laser beam 34 is currently pointing.

Display: In Step 12, sends data and diagnostic information to a terminal (not shown). The system detects whether a terminal and keyboard (not shown) are connected. If not, this function is inactive.

Restart_TOF: In Step 13, commands the time of flight processor 103 to begin collecting the next data set from the count signal 61A.

Record_Data: In Step 14, formats a collection of data and diagnostic information, and writes it to storage media (not shown). Provides file management functions for opening, closing, and naming files.

Monitor_System: In Step 15, checks a variety of temperatures, voltages and other operating conditions, and uses them to determine the operability of the system 46.

Get_DSP_Data: In Step 16, the control processor 106 reads the memory 88 of the DSP processor 63.

Get_Time: In Step 17, reads an IRIG time signal (not shown) provided by the aircraft 20. If this signal is unavailable, a time-of-day clock (not shown) built into the control processor 106 is read instead.

Laser_Monitor: In Step 18, checks that the laser 66 is ON and checks the laser output power. If the power is below an acceptable value, it attempts to adjust the temperature of the laser cooler 77 until the power output of the laser 66 rises to an acceptable value.

Generate_PAS: In Step 19, compares the strength of the contrail 21 to a fixed standard to produce a numerical value which represents the amount of contrail 21 present.

Send_PAS: In Step 20, uses the result obtained by the 'Generate_PAS' module to notify the pilot of the aircraft 20.

Update_Task: In Step 21, determines if the laser beam 34 needs to be pointed in a different direction to locate part of the detection volume 37 where the contrail 21 is not located.

Laser_Pointing: 2: In Step 22, determines the angle relative to the horizontal axis 93 and the vertical axis 92 at which the laser beam is currently pointing.

Monitor_pressure: In Step 23, reads information from a pressure transducer (not shown). If this information indicates that the aircraft 20 is below a particular altitude, it disables the laser 66 for eye safety purpose, for example.

Shutdown: In Step 24, performs an orderly shutdown of the system 46 by closing data files and removing power to the laser and other parts of the system.

Monitor_Keyboard: In Step 25, determines if a terminal or a keyboard is connected to the system. This information is then used by the "Display" function.

DESCRIPTION OF DSP SOFTWARE MODULES

The DSP processor 63 is controlled using the following computer program modules which are shown on FIGS. 7A through 7H. The source code for these modules is set forth in the Microfiche Appendix.

rvm_DSP 118 (FIG. 7A): This is the main routine for the DSP processor 63. This routine calls a send_addr() module 119 (FIG. 7B) so that the control processor 106 can initialize various global variables (see Step 34, FIG. 7A). Once the variables are loaded in the rvm_DSP routine 118, the EXEC 106 sets a first flag 120 and the rvm_DSP routine 118 enters a minor loop 121 (see Step 36, FIG. 7A) of a grand loop 122 in which it waits for a second flag 124 to be set by the EXEC 106. Once the EXEC 106 sets the second flag 124, the rvm_DSP routine 118 exits the minor loop 121 to Step 37. After reading the DT-Connect bus 117, and other initial processing, a corr() routine 126 (Step 40) constructs the profile 51 (see corr() routine 126, in FIG. 7D), calls a discrim() routine 127 to determine if a contrail 21 exists, and waits (see the grand loop 122, second flag 124) for the EXEC 106 to set the second flag 124 again. The EXEC 106 writes operating parameters to and reads results from the memory 88 of the DSP processor 63.

send_addr 119 (FIG. 7B): The send_addr routine 119 writes the following starting array addresses to a host port 128:

| Array Address | Chart 1<br>Corresponds To |
|---|---|
| ans [] | this is the result of the correlation of the summed data bins [] with the correlating |

| Array Address | -continued<br>Chart 1<br>Corresponds To |
|---|---|
| code [] | pattern code [].<br>the correlating pattern or "a'" code. |
| raw [] | the data as received from the time of flight processor 103. |

The send_addr routine also writes to the host port 128 the addresses of the following variables:

| Address of Variable | Chart 2<br>Description of Variable |
|---|---|
| codelen | length of M-code (=255). |
| datalen | length of data set (=510). |
| rawsets | how many times does the sequence repeat in the raw data. |
| rawpoints | how many points will the TOF send. |
| scalefact | scales correlated counts to true backscatter. |
| 1stflag 120 | used to delay start until operating parameters are in place. |
| 2ndflag 124 | used in DT-Connect transfer protocol. |
| structure p | operating parameters. |
| structure t | detection thresholds. |
| structure w | warning data structure. |

The send_addr routine 119 then returns to the rvm_DSP routine 118.

Figure 7A:
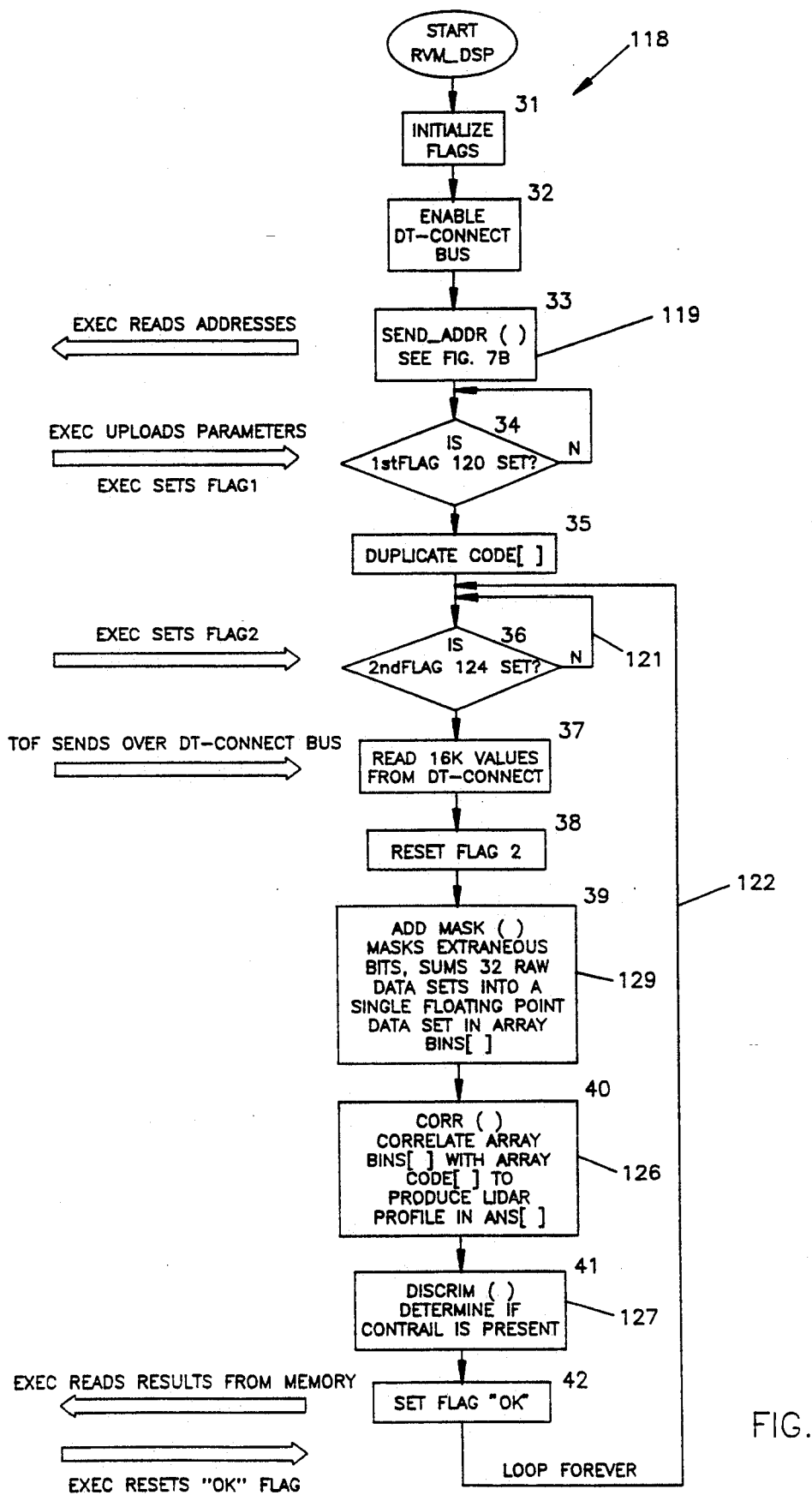
Figure 7B:
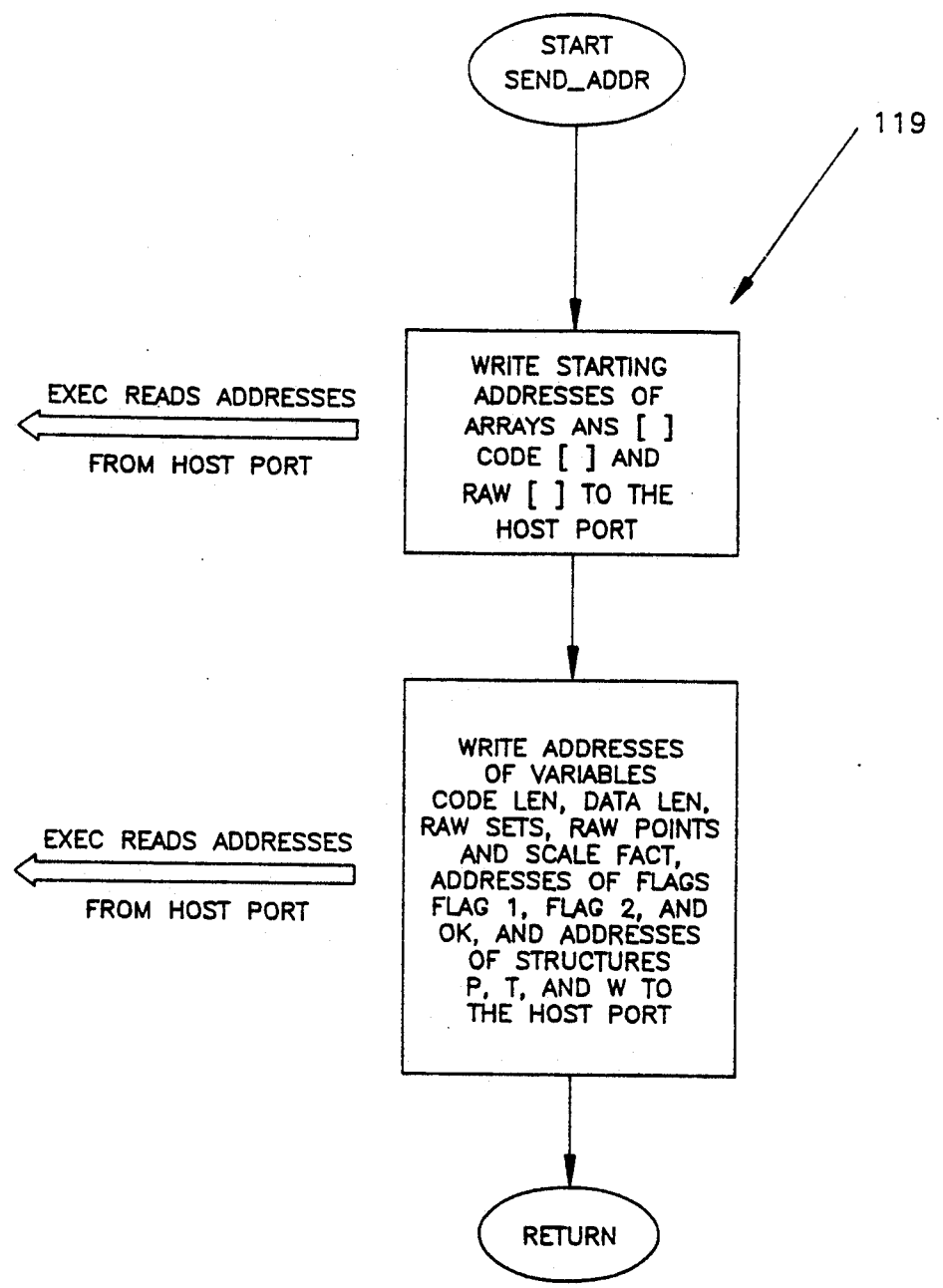
Figure 7C:
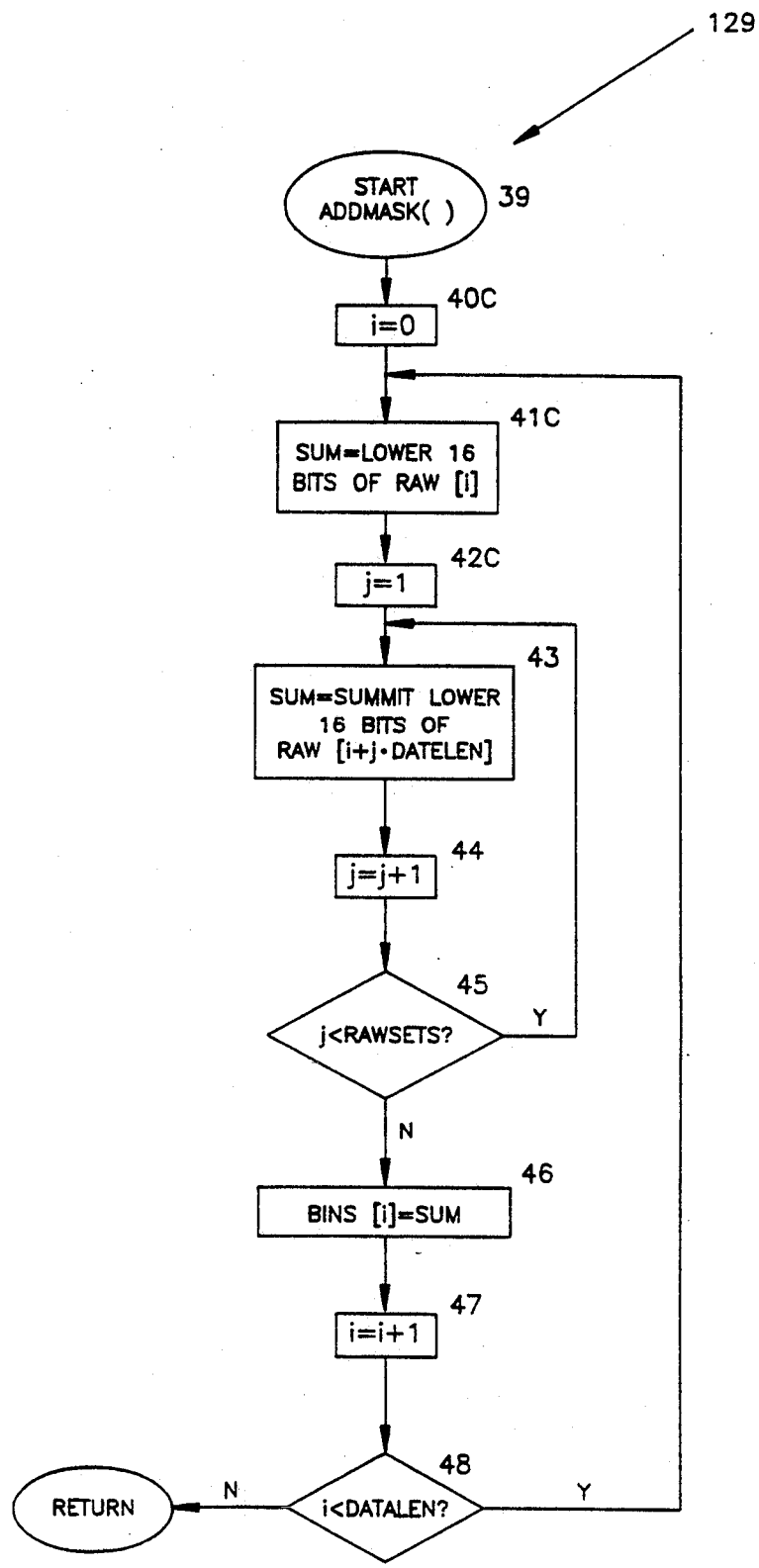
Figure 7D:
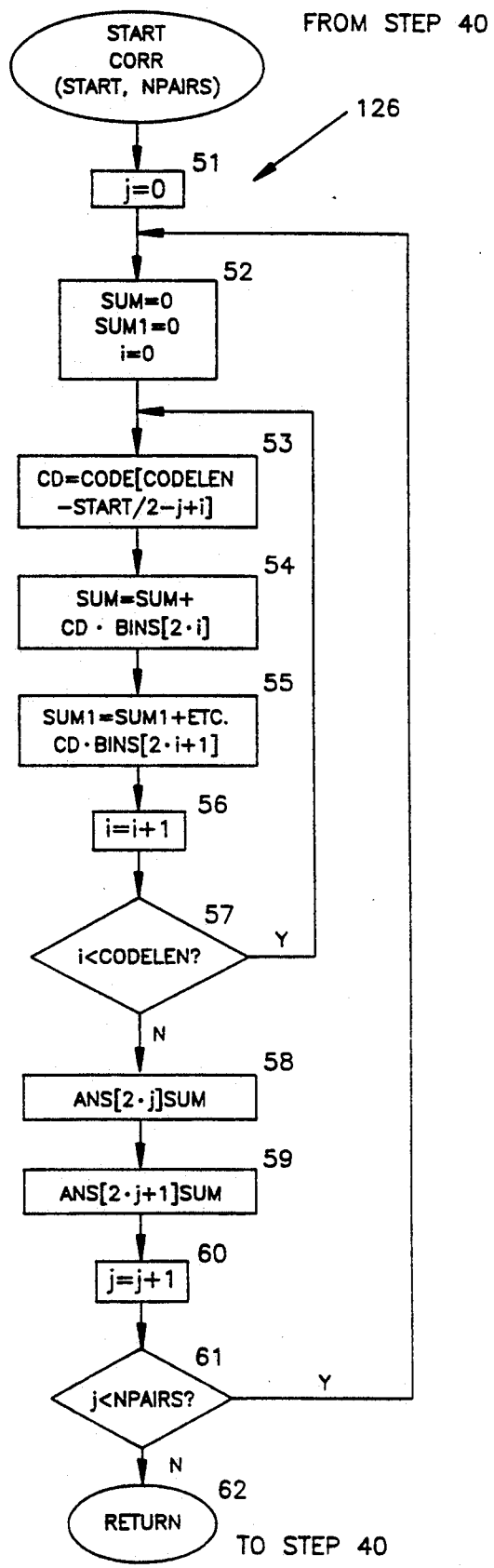
Figure 7E:
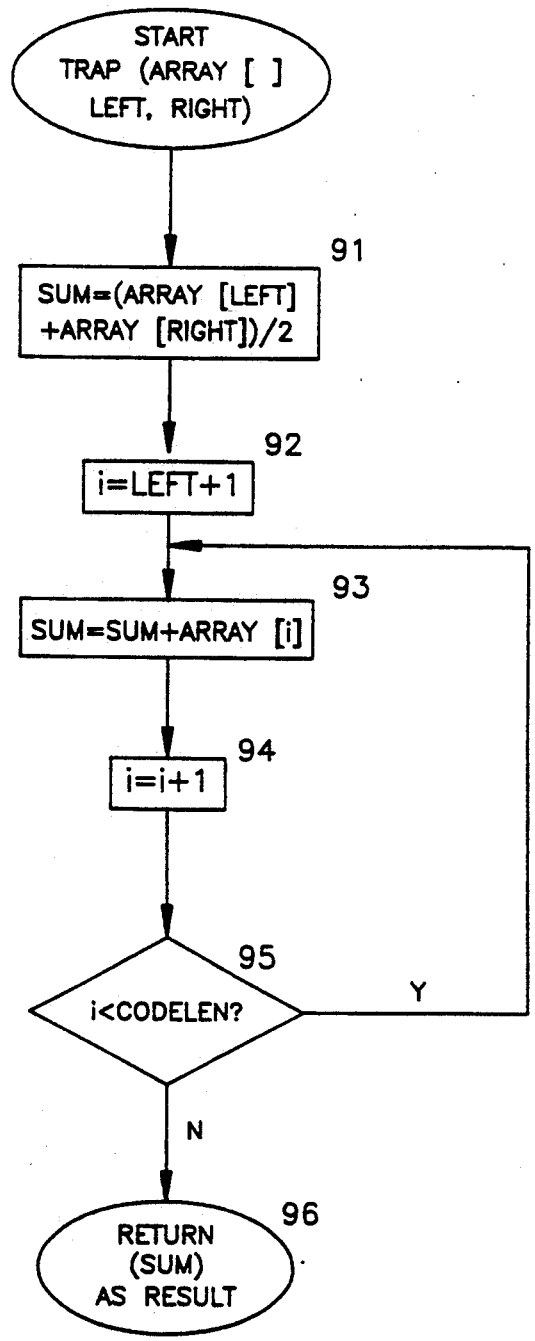
Figures 1, 7F:
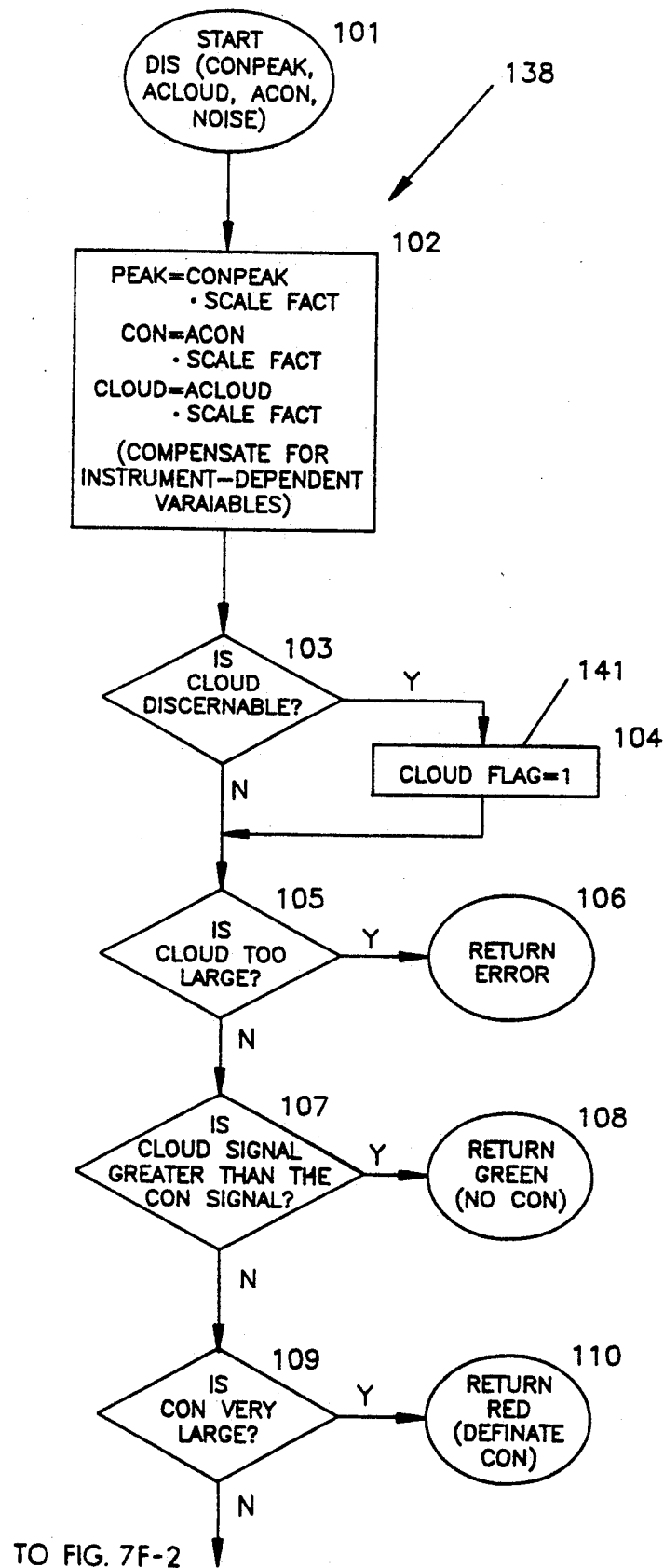
Figures 2, 7F:
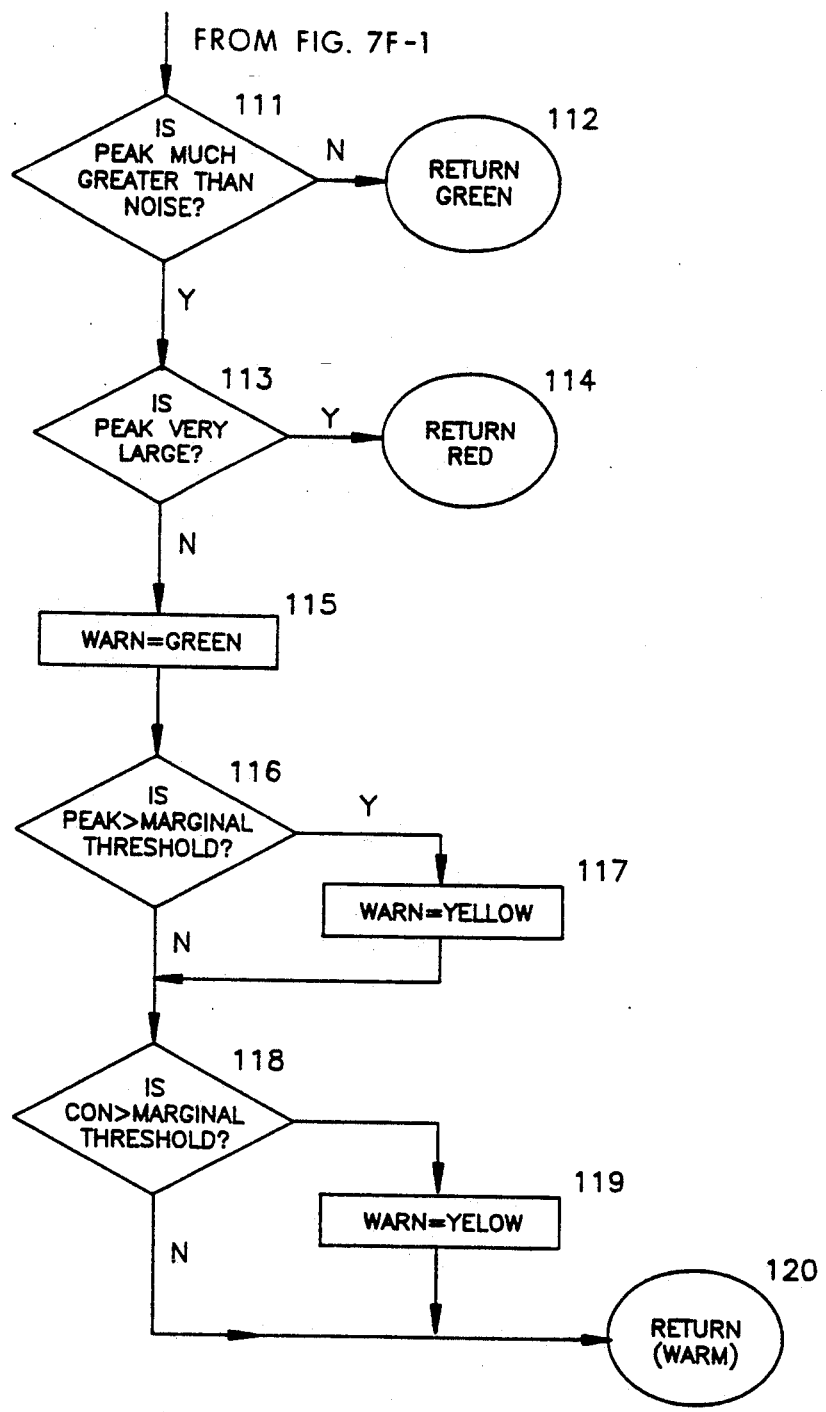

Referring again to FIG. 7A, the EXEC 106 determines that the time of flight processor 103 has finished performing the 256 sweeps to obtain the samples from the count signal 61A, and resets the second flag 124 to cause looping in Step 36.

addmask () 129 (FIG. 7C): After the 16,320 values are read from the bus 117, the addmask() routine 129 masks out the upper sixteen bits of the 32 bit integer representing each $\Delta t$, selects the lower sixteen bits of such integer and obtains the "sum" (or sampled count signal 61B) in Step 41. An "i" counter 131 counts an outer loop 132 from zero to 509, and a "j" counter 132 counts an inner loop 134 from one to thirty-two. In Step 46, the sampled count signal 61B, or "sum" (FIG. 7G), is written into the array "bins[i]" for each of the 510 $\Delta t$ intervals of the single 510 channel data set.

corr() 126 (FIG. 7D): The corr() routine 126 correlates the cross correlation pattern 56 with the resolved count signal 62. It is recalled that the pattern 56 has values of one and minus one corresponding to the respective zeros and ones of the modulation sequence of the output beam 34. The corr() routine 126 processes Equations 1-4 described above under the "Cross Correlation" heading. As noted, each $\Delta t$ is sampled twice. This is done by varying "i" and "j", by considering the data as a complex array, and correlating a complex function with a real function. The result of the cross correlation is returned in Step 62 to an "ans[]" array (FIG. 7A, Step 40).

Figure 7G:
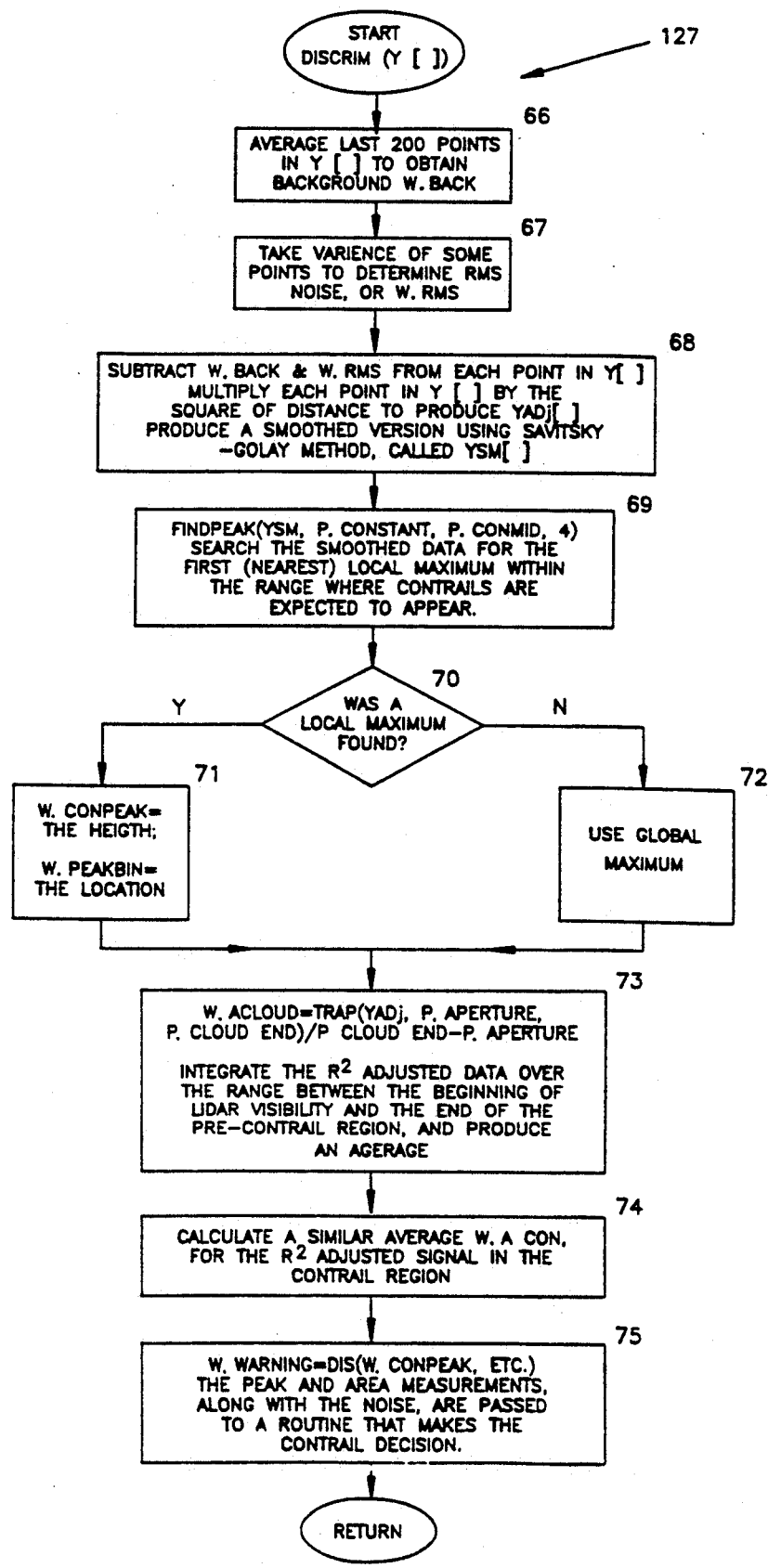

Referring now to FIG. 7G, the address of the "ans[]" array is passed to a data structure "w.", which identifies "warning." The warning is in the form of a recommendation from the discrim() routine 127 in the form of either:

1. Green: No contrail 21—invisible.
2. Yellow: Marginal: (a) contrail 21 not readily visible, or (b) contrail 21, but flying through cloud 48 (not readily visible).

3. Red: Large backscatter signal—contrail 21 most-likely visible.

In FIG. 7G, a generic representation of the return from the addmask routine 129 is referred to as "y[]", which includes the array "ans[]". In Step 66, a constant d.c. level is obtained by identifying the two hundred eightieth Δt past the start of a sequence (such as the M-code). The value of the two hundred Δt intervals after the two hundred eightieth Δt are averaged, which is referred to as "w.back" in FIG. 7G, Step 66. A standard deviation is determined and designated "w.rms" in Step 67.

In Step 68, w.back is subtracted from each value of Δt in y[] (or "ans[]"). Then an array "y.adj[]" is obtained by multiplying each value of Δt by the corresponding value of r², the range of that value of Δt. Finally, a Savitsky-Golay method (see *Analytical Chemistry*, Vol. 36, no. 8, p. 1627) is used to smooth the y adj[] array and result in generating an array "ysm[]".

findpeak() 138 (FIG. 7H): In Step 69 (FIG. 7G), the Δt intervals corresponding to part of the detection volume 37 are evaluated by the findpeak() routine 138. That part is from the onset distance 31 half way to the end of the maximum distance 43 in which the onset 33 generally forms. The findpeak() routine 138 uses ysm[], a value "p.constart" which represents the value from ysm[] of the Δt at the onset distance 31, and a value "p.conmid" which represents the value of from ysm[] of the Δt half way between the onset distance 31 and the maximum distance 43.

Figure 7H:
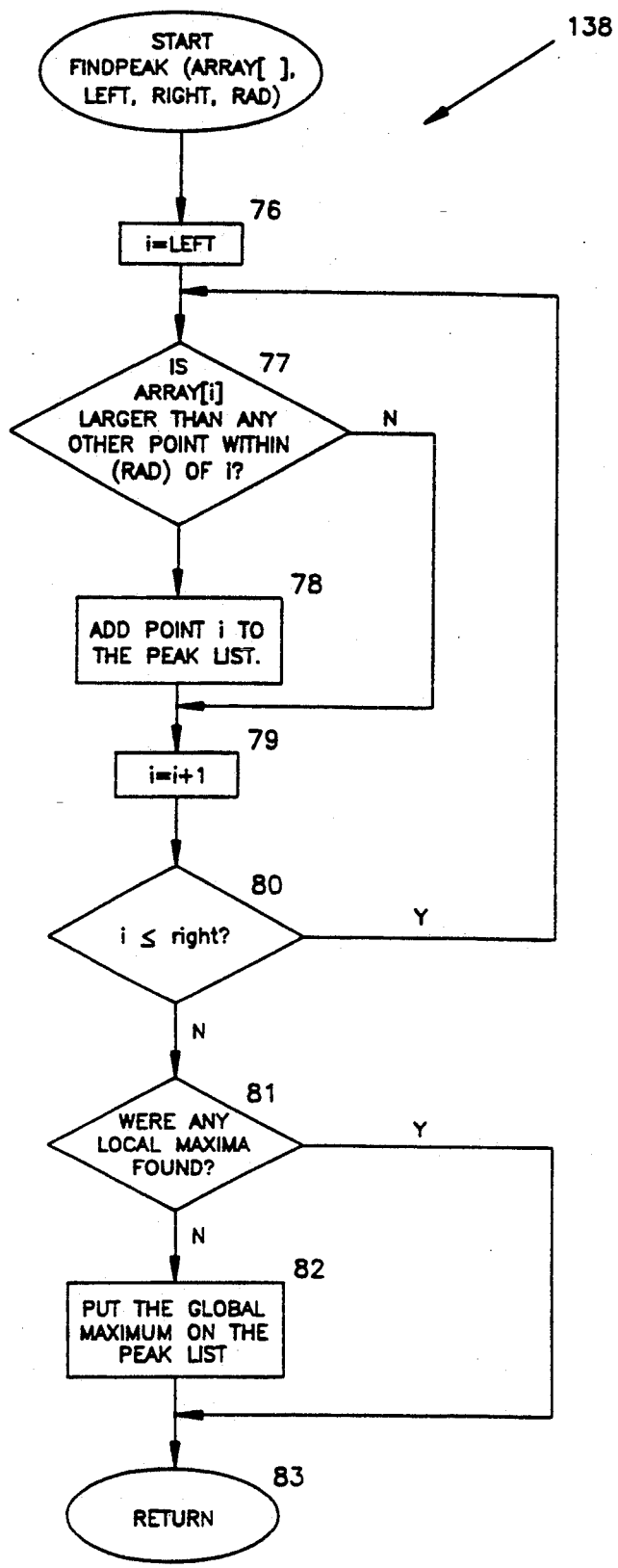

The findpeak() routine 136 is shown in FIG. 7H and starts processing using the "p.constart" value, which represents the end 39 (FIG. 2A) of the detection volume 37. The "findpeak() routine 138 makes a list of those points within an array which are larger than a certain number of neighbors to either side of the point. The larger value Δt's (local maxima) are listed and Step 77 repeated until the value of p.conmid is processed. (Step 71, FIG. 7G).

If no local maxima were found (between distance 31 and half way to distance 45), use is made of such Δt as is between those distances 31 and half way to 45 and as has the greatest value. (Step 72, FIG. 7G). This is referred to as a global maximum.

The nearest local maximum from Step 81 (FIG. 7H) or the global maximum from Step 82 (FIG. 7H) is returned to Step 69 (FIG. 7G).

In Step 71, "w.conpeak" represents the value of the local maxima and "w.peakbin" the index of the Δt of that "w.conpeak" value.

Returning to FIG. 7G, two averages are obtained in Steps 73 and 74. The first is of the values of the yadj[] array for all Δt intervals from the point 75 (FIG. 3, at which the telescope field of view 72 and the laser beam 34 intersect), to the contrail onset distance 31.

trap 137 (FIG. 7E): In Step 91, the trap routine 137 is processed. Array[left] corresponds to the value at the point 75, and array[right] the value at the distance 31. The trap() routine 137 returns an average value based on the return beam 36 from a cloud 48 in that range (from the point 75 to the onset distance 31). The routine 137 also processes Steps 91–96 using the w.constant and w.conmid values, and returns Acon as the average contrail value (see Step 74, FIG. 7E).

dis() 138 (FIG. 7G): A w.warning value is computed in Step 75 by calling the dis() routine 138. Referring to FIG. 7G, the "start" Step 101 includes the identified arrays previously computed, namely those shown in the following Array Chart:

| Array Chart | |
|---|---|
| w.conpeak | value of contrail maxima |
| Acloud | average value of cloud 48 in pre-contrail range (point 75 to distance 31). |
| Acon | average value of contrail 21, in first ¼ of detection volume 37. |
| noise | rms background noise, scaled to distance of peak 64. |

Scaling is performed in Step 102 to take into account power of the laser 66, and meteorological data (e.g., backscatter coefficient of cirrus clouds), for example.

In Step 103, the amplitude or value of "con" is compared to a threshold, and a cloud flag 141 is set to "yes". In Step 105, if the amplitude of the cloud array is too large, a conclusion is reached that there is an error (Step 106).

In Step 107, it is expected that the amplitude of "con" (Step 102) will exceed that of "cloud" (Step 102) if there is a contrail 21 in the detection volume 37. If "cloud" exceeds "con", a "no contrail" return is generated in Step 108.

In this regard, "con" represents whatever return there is from the first half of the detection volume 37. However, in Step 109, where the "con" value is very large, it is determined that a contrail exists and Step 110 so indicates.

Steps 108 and 109 result in the more definite conclusions. A less definite situation is processed in Steps 111–119.

In Step 111, if the peak of the profile 51 (or value of "con") is not very large, i.e., not much greater than (e.g., not at least four times) the value of the noise (FIG. 7G, Step 67), Step 112 returns "green" to indicate no contrail 21.

Where the value of "con" exceeds that of the noise by at least a preset amount (four times), Step 113 determines whether the high value is large enough to unambiguously indicate a contrail 21. If so, it is determined that a contrail 21 is present (Step 114).

If the peak is not large enough to unambiguously indicate a contrail 21, Step 115 sets a green warning, which is "tentative." The criteria in Step 116 (peak not exceeding threshold) or Step 118 ("con" value exceeds a threshold) cause the warning to change to yellow, to indicate that the formation of a visible contrail 21 is imminent.

The returns from Steps 106, 108, 110, 112, 114, 117 and 119 are returned to the w.warning value 135 in the discrim() routine 127 (Step 75, FIG. 7G).

The program rvm DSP now sets the "ok" flag equal to one, indicating that a result is available. The control processor 106 then reads the contents o the w. structure from the memory 88 of the DSP 63 to determine the status of the contrail 21.

The loop 122 is then taken to Step 36.

SUMMARY OF SPECIFICATION FOR SYSTEM 64

Table 1 identifies an exemplary specification for the system 46.

TABLE 1

Laser diode:

TABLE 1-continued

GaAlAs-Dl
Wavelength: $\lambda = 823$ nm
Output: $P_o = 100$ mW
Driving current: 75 MA (bias) + 35 mA (modulation)
Temperature control range: 10° C.
Wavelength tuning range: $\Delta\lambda$ 10 nm
Beam divergence: <0.1 mrad (after collimation)

Modulation
M-sequence random code
clock time: $\Delta t = 40$ nsec
Number of elements: $N = 255 (=2^8 - 1)$
Period: $T = 10.2$ microseconds
Range resolution: 6 meters Receiving optics
Telescope: Cassegrainian reflection type
Aperture: 50 mm
Effective focal length: $f = 200$ mm
Field of view: 17 mrad
Bandwidth of a narrowband interference filter: 0.5 nm
Distance between laser and telescope ports: 120 mm Detector:
PMT: Quantum efficiency: 10%

APD: Two types of Avalanche Photodetectors (APD) may be used in addition to the Photomultiplier Tube (PMT). The first APD is the Photon Counting type, and the second APD is the Analogue type. The Quantum Efficiency is 80% for each of the two types of APDs.
Signal processor:
ADC: 8 bit
Accumulating: up to $2^{16} - 1$ The three state visibility indicator is available on three bits of a sixteen bit parallel binary word.

While the preferred embodiments have been described in order to illustrate the fundamental relationships of the present invention, it should be understood that numerous variations and modifications may be made to these embodiments without departing from the teachings and concepts of the present invention. Accordingly, it should be clearly understood that the form of the present invention described above and shown in the accompanying drawings is illustrative only and is not intended to limit the scope of the invention to less than that described in the following claims.

What is claimed is:

1. An airborne system for indicating that a contrail is forming at a distance behind an aircraft, said contrail having an onset which normally occurs within a predetermined contrail onset range behind the aircraft, said system comprising:
   means carried by the aircraft for directing a lidar signal behind the aircraft into intersection with at least the onset of a contrail which has formed behind the aircraft, the onset of the contrail being within the contrail onset range, said lidar signal being scattered back toward the aircraft by the contrail to form a return signal having an amplitude related to said distance at which the contrail forms behind the aircraft, said directing means modulating the lidar signal according to a pseudo-random pattern, the return signal having a pattern related to said pseudorandom pattern; and
   means carried by the aircraft for cross correlating said pattern of the return signal and the lidar signal to generate a profile of the amplitude of the return signal according to said distance from the aircraft, said profile having a peak within the onset range and corresponding to said distance of the onset behind the aircraft for indicating that the contrail is being formed behind the aircraft.

2. A system according to claim 1, wherein the onset range starts at a selected distance behind the aircraft, further comprising:
   said directing means directing said lidar signal along a first path into the contrail onset range;
   said cross correlating means being responsive to the return signal scattered along a second path; and
   said directing means and said cross correlating means being interrelated such that said first and second paths intersect at a distance behind the aircraft past the selected distance and within the contrail onset range.

3. A system according to claim 2, further comprising:
   a platform on said aircraft;
   said directing means and said cross correlating means being mounted on said platform offset from each other.

4. A system according to claim 1, further comprising:
   said cross correlating means comprising:
   means for temporally grouping the return signal;
   means for cross correlating the pattern of the lidar signal with the pattern of the temporally grouped return signal to generate an output indicative of the amplitude of the return signal with respect to distance behind the aircraft from which the lidar signal was scattered back toward the aircraft; and
   means for indicating that there is a peak in the amplitude corresponding to a distance behind the aircraft, which distance is within the onset range, the peak indicating that a contrail is being formed behind the aircraft.

5. A system for detecting a contrail resulting from operation of an aircraft at high altitude, wherein the contrail forms along an axis at a distance behind the aircraft within a contrail onset range generally close but not immediately behind the aircraft and has an onset within the onset range, said system comprising:
   means for generating a continuous-wave output signal having a pseudorandom output sequence;
   means for mounting said generating means on said aircraft to direct the output laser signal into intersection with a contrail extending along the axis behind the aircraft, said signal being scattered back toward the aircraft by the contrail onset to form a return signal having an amplitude related to said distance and having a sequence related to the output sequence;
   means for temporally grouping the return signal;
   means for cross correlating the output sequence with the temporally grouped return signal to generate an output indicative of the amplitude of the return signal with respect to distance relative to the aircraft from which the return signal was scattered back toward the aircraft; and
   means for determining whether there is a peak in the amplitude of the return signal corresponding to a first distance from the aircraft which is within the onset range to indicate that a contrail is resulting from operation of the aircraft.

6. A system according to claim 5, wherein the output laser signal has a wavelength and is controlled so as to minimize detection at a second distance away from the aircraft, said second distance being great relative to the contrail onset range, said system further comprising:

means for controlling said generating means so that the wavelength of the output laser signal is selected so that the laser signal is not visible.

7. A system according to claim 6, wherein the output signal having said wavelength is highly absorbed by water vapor.

8. A system according to claim 6, further comprising:
means for moving said mounting means and said grouping means in synchronism to sweep the output signal relative to the axis behind the aircraft and to receive the return signal.

9. A system according to claim 6, further comprising:
means for sensing the lidar signal; and
means responsive to the lidar signal having a wavelength other than the selected wavelength for controlling said generating means to generate said lidar signal at the selected wavelength.

10. A system according to claim 5, further comprising:
said mounting means including a first aperture for permitting said output signal to be directed along a first path; and
means for admitting to said grouping means only that portion of the return signal which is returned along a second path positioned at an angle from said first path so that said portion is received from not less than a minimum distance from the generating means.

11. A system according to claim 5, wherein the aircraft has a plurality of engines the operation of one of which may result in a contrail being formed behind the aircraft without the operation of a second of said engines resulting in the formation of a contrail, said system further comprising:
said system having one of said generating means for each of said engines, each of said generating means being operated at a different output sequence which is distinguishable from the other output sequences;
said output signals being scattered back by each said contrail to form one of said return signals from each of said contrails, said return signals each having a different output sequence; and
said grouping and said cross correlating means being effective separately with respect to each of said different output sequences of said return signals to indicate separately for each particular one of said engines whether a contrail is resulting from the operation of said particular engine.

12. A system according to claim 5, further comprising:
said mounting means being effective in directing said output signal behind the aircraft by moving said output signal in a sweeping path to bring said output signal into intersection with a leading edge of any contrail, said sweeping being relative to the axis so that at least some portion of the leading edge of any contrail which has formed at a location behind the aircraft is in the path of the output signal to produce said return signal from said portion;
movable means for receiving said return signal from said portion of said leading edge of said contrail, said movable means being moved in coordination with said sweeping path of said output signal to identify the location of the portion of the contrail which is causing the return signal at a particular time; and means for correlating the amplitude of the return signal scattered back from a particular range, with the range of the portion of the leading edge of the contrail which has resulted in that return signal to define a profile indicating the range of the leading edge of the contrail.

13. A system for detecting a contrail which results from operation of an engine of an aircraft, the contrail forming at a distance behind the aircraft and having an onset corresponding to a front portion of the contrail, the onset generally being within a maximum distance from said aircraft, said maximum distance being short relative to the distance at which the contrail extends behind the aircraft, the front portion having a definable shape, said system comprising:
means for generating an output lidar signal;
means for modulating the lidar signal according to a pseudorandom pattern;
means for storing a cross correlation pattern corresponding to the pseudorandom pattern;
means for mounting said generator means on said aircraft to direct said output lidar signal into any contrail which forms within the maximum distance so that said signal is scattered back toward the aircraft and forms a return signal having amplitude and a pattern related to the pseudorandom pattern;
means carried by the aircraft for detecting the return signal and generating a count signal;
means responsive to the count signal for resolving the count signal into temporal bins to form a histogram; and
means for cross correlating said cross correlation pattern with the histogram to define a profile of the amplitude of the return signal as a function of the distance from the aircraft, said profile having a peak at one such distance within the maximum distance to indicate that a contrail has formed as a result of operation of said engine.

14. A system according to claim 13, wherein the contrail onset also generally occurs between said maximum distance and a minimum distance behind the aircraft, the engine having a longitudinal axis extending behind the aircraft, said system further comprising:
said generating means directing the lidar signal behind the engine along a first path at an acute angle relative to the longitudinal axis; and
said resolving means being responsive to the return signal scattered back toward the engine along a second path which intersects the first path between the minimum and maximum distances.

15. A system for indicating that there is a contrail resulting from operation of an engine of an aircraft, said system indicating that the contrail has formed behind the engine in a detection volume having a selected dimension starting at a given distance aft of the engine and extending rearwardly of the engine, the contrail having an onset at which a front portion of the contrail is positioned, the onset generally being within a maximum distance from the aircraft, said maximum distance being short relative to the distance at which the contrail extends behind the engine and long relative to the given distance, the front portion having a definable shape, said system comprising:
means for generating a lidar output signal;
means for modulating the lidar signal according to a pseudorandom pattern;
means for storing a cross correlation pattern corresponding to the pseudorandom pattern;

means for mounting said generating means on the aircraft offset from the engine by a first offset distance and for directing said lidar signal transversely of said selected dimension to intersect any contrail onset which forms within said detection volume so that said lidar signal is scattered back toward the engine and forms a return signal having amplitude and a pattern related to the pseudorandom pattern;

means for tracking the location of said contrail, said tracking means being mounted on the aircraft offset from the engine by a second offset distance, the second distance being different from the first offset distance, said tracking means being responsive to the return signal for resolving the return signal into temporal bins to form a histogram; and means for cross correlating the cross correlation pattern with the histogram to define a profile of the amplitude of the return signal as a function of distance from the aircraft, the profile having a peak at a distance within the selected dimension of the detection volume to indicate that a contrail has formed as a result of said engine.

16. An indicating system according to claim 15, wherein said engine has a thrust axis extending parallel to said selected dimension, said system further comprising:

said mounting and directing means being offset from the thrust axis of said engine to cause the lidar signal to be scattered back in paths within the detection volume, said detection volume being frustoconical; and said resolving means including a lidar signal detector carried by said mounting means and moved in synchronism with the return signal.

17. An indicating system according to claim 16, further comprising:

said detector being an avalanche photodiode; and
means for operating said avalanche photodiode below the diode breakdown voltage of said photodiode.

18. An indicating system according to claim 16, wherein said aircraft has first and second ones of said engines, and a first of said indicating systems is provided for said first engine and a second of said indicating systems is provided for said second engine, said first and second indicating systems further comprising:

said modulating means of said first and second systems causing the lidar signals generated by said respective first and second systems to have different pseudorandom patterns having no relative cross correlation.

19. A system according to claim 15, further comprising:

said mounting means moving said detector to receive a lidar signal scattered from within said detection volume and not a lidar signal reflected from a position between said engine and the given distance aft of said engine.

20. A system for indicating according to claim 15, said lidar signal having a wavelength, further comprising:

said generating means causing the wavelength of the lidar signal to be a selected wavelength both in the invisible range and at which the lidar signal is highly absorbed by water vapor to limit the amplitude of the lidar signal transmitted beyond the detection volume aft of said aircraft.

21. A system for indicating according to claim 15, further comprising:

said modulating means causing said pseudorandom pattern to be an A-sequence pseudorandom code; and said generating means causing said lidar signal to be continuous-wave at power which is low relative to a pulsed signal.

22. A method of determining whether a contrail is forming behind an aircraft, wherein the contrail may be in or adjacent to a cloud, comprising the steps of:

directing a lidar beam rearward of the aircraft;
defining a first zone immediately aft of the aircraft, a second zone immediately aft of the first zone and in which no contrail normally forms, and a third zone immediately aft of the second zone and in which a contrail normally forms;

detecting a return signal backscattered by said contrail if said contrail is forming and by any such cloud in said second zone;

obtaining a cloud signal representing the average value of the return signal returned from the second zone;

obtaining a first contrail signal representing a peak in the value of the return signal returned from a contrail in the third zone;

obtaining a second contrail signal representing the average of the return signal returned from the third zone; and comparing the cloud signal to the second contrail signal and determining, if the value of the cloud signal is greater than the value of the second contrail signal, that no contrail is forming behind the aircraft.

23. The method of claim 22, comprising the further steps of:

upon determining that the value of the cloud signal does not exceed the value of the second contrail signal, determining whether the second contrail is very large as compared to a threshold to indicate that a contrail is forming behind the aircraft.

24. The method of claim 23, comprising the further steps of:

determining the value of noise which is included in the return signal; and comparing the noise value to the value of the first contrail signal and, if the latter value is not substantially greater than the former value, determining that no contrail is forming behind the aircraft.

25. The method of claim 24, comprising the further step of:

if the comparing step results in the value of the first contrail signal being substantially greater than the noise value, determining that the first contrail signal is temporally limited to a defined temporal interval to indicate that a contrail is forming behind the aircraft.

26. The method of claim 25 comprising the further steps of:

if no contrail indication results from the comparing and determining steps, then comparing the first contrail signal and the cloud signal to respective thresholds; and if either the value of the first contrail signal or the value of the cloud signal exceed the respective threshold, generating a warning that the formation of a contrail is imminent.

* * * * *